United States Patent
Inoue et al.

(10) Patent No.: US 11,411,409 B2
(45) Date of Patent: Aug. 9, 2022

(54) MANAGEMENT APPARATUS, ENERGY STORAGE APPARATUS, AND ENERGY STORAGE SYSTEM

(71) Applicant: GS Yuasa International Ltd., Kyoto (JP)

(72) Inventors: Tomoshige Inoue, Kyoto (JP); Katsuhisa Michinaga, Kyoto (JP); Takatomo Yoshioka, Kyoto (JP); Takashi Ikeda, Kyoto (JP); Kota Seto, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 301 days.

(21) Appl. No.: 16/604,086

(22) PCT Filed: Apr. 27, 2018

(86) PCT No.: PCT/JP2018/017275
§ 371 (c)(1),
(2) Date: Oct. 9, 2019

(87) PCT Pub. No.: WO2018/199311
PCT Pub. Date: Nov. 1, 2018

(65) Prior Publication Data
US 2020/0153255 A1 May 14, 2020

(30) Foreign Application Priority Data

Apr. 28, 2017 (JP) .............................. JP2017-090312

(51) Int. Cl.
*H02J 7/00* (2006.01)

(52) U.S. Cl.
CPC .......... *H02J 7/0014* (2013.01); *H02J 7/0013* (2013.01); *H02J 7/0016* (2013.01); *H02J 7/0048* (2020.01);
(Continued)

(58) Field of Classification Search
CPC ...... H02J 7/0014; H02J 7/0013; H02J 7/0016; H02J 7/0048; H02J 7/007182; H01M 10/44; H01M 10/48
(Continued)

(56) References Cited

U.S. PATENT DOCUMENTS 5,115,183 A * 5/1992 Kyoukane ............. H02J 7/1476
320/123
5,547,775 A 8/1996 Eguchi et al.
(Continued)

FOREIGN PATENT DOCUMENTS

JP     H04-331425 A     11/1992
JP     2003-111291 A     4/2003
(Continued)

OTHER PUBLICATIONS

International Searching Authority, International Search Report and Written Opinion for International Application No. PCT/JP2018/017275, dated Jul. 17, 2018, (10 pages), Japan.

*Primary Examiner* — John T Trischler
(74) *Attorney, Agent, or Firm* — Alston & Bird LLP

(57) ABSTRACT

A management device 21 comprising a main control part 23 that, during charging of a plurality of power storage elements 41 connected in series, outputs a first pull-down signal to a converter 11 so as to lower a charging voltage when the cell voltage of any of the power storage elements 41 is equal to or greater than a first threshold value.

14 Claims, 21 Drawing Sheets

(52) U.S. Cl.
CPC ......... *H02J 7/007182* (2020.01); *Y02E 60/10* (2013.01)

(58) Field of Classification Search
USPC ........................................ 320/134
See application file for complete search history.

(56) References Cited

U.S. PATENT DOCUMENTS

| | | | | |
|---|---|---|---|---|
| 5,602,481 | A * | 2/1997 | Fukuyama | H02J 7/0016 324/426 |
| 6,456,042 | B1 * | 9/2002 | Kwok | H02J 7/00711 320/134 |
| 6,586,913 | B2 * | 7/2003 | Rolfes | H02J 7/1446 320/139 |
| 6,809,501 | B2 * | 10/2004 | Kapsokavathis | H02J 7/1469 320/132 |
| 7,633,269 | B2 * | 12/2009 | Chou | H02J 7/00711 320/162 |
| 7,675,267 | B2 * | 3/2010 | Ozawa | H02J 7/0031 320/134 |
| 7,683,574 | B2 * | 3/2010 | Guang | H02J 7/00712 320/121 |
| 8,030,902 | B2 * | 10/2011 | Kung | H01M 10/441 320/160 |
| 8,193,778 | B2 * | 6/2012 | Morina | H02J 7/0071 320/153 |
| 8,299,759 | B2 * | 10/2012 | Okamura | H02J 7/0072 320/134 |
| 8,436,588 | B2 * | 5/2013 | Morina | H02J 7/0071 320/153 |
| 9,197,080 | B2 * | 11/2015 | Shiraishi | H02J 7/0014 |
| 9,438,055 | B2 * | 9/2016 | Chen | H02J 7/007 |
| 9,450,443 | B2 * | 9/2016 | Dai | G01R 31/382 |
| 9,702,939 | B2 * | 7/2017 | Brockman | H02J 7/00 |
| 9,722,436 | B2 * | 8/2017 | Shiraishi | H02J 7/0014 |
| 9,740,264 | B2 * | 8/2017 | Tsutsui | H02J 7/042 |
| 9,840,161 | B2 * | 12/2017 | Chikkannanavar | B60L 58/21 |
| 9,931,950 | B2 * | 4/2018 | Demure | B60L 1/003 |
| 10,071,648 | B1 * | 9/2018 | K | H01M 10/0525 |
| 10,211,659 | B2 * | 2/2019 | Tian | H02J 7/0069 |
| 10,283,993 | B2 * | 5/2019 | Deng | H02J 7/00 |
| 10,389,155 | B2 * | 8/2019 | Deng | H02J 7/0071 |
| 10,424,958 | B2 * | 9/2019 | Tian | H02J 7/00714 |
| 10,483,782 | B2 * | 11/2019 | Chou | H02J 7/007184 |
| 10,498,156 | B2 * | 12/2019 | Zhang | H02J 7/007 |
| 10,539,626 | B2 * | 1/2020 | Yoshioka | H02J 7/0026 |
| 10,625,622 | B2 * | 4/2020 | Bando | B60L 58/20 |
| 10,749,372 | B1 * | 8/2020 | Bica | H02J 7/1415 |
| 10,830,823 | B2 * | 11/2020 | Inoue | G01R 31/374 |
| 10,948,545 | B2 * | 3/2021 | Mori | G01R 31/008 |
| 2003/0029654 | A1 * | 2/2003 | Shimane | B60L 50/16 180/65.29 |
| 2004/0189254 | A1 * | 9/2004 | Kapsokavathis | H02J 7/1469 320/132 |
| 2005/0035742 | A1 * | 2/2005 | Koo | G01R 31/3842 320/149 |
| 2005/0140333 | A1 * | 6/2005 | Chou | H02J 7/00711 320/116 |
| 2007/0075682 | A1 * | 4/2007 | Guang | H02J 7/00712 320/128 |
| 2008/0012533 | A1 * | 1/2008 | Guang | H02J 7/0086 320/134 |
| 2008/0042615 | A1 * | 2/2008 | Serrels | B60L 1/02 320/101 |
| 2009/0015209 | A1 * | 1/2009 | Morina | H02J 7/0013 320/153 |
| 2009/0309547 | A1 * | 12/2009 | Nakatsuji | H01M 10/441 320/164 |
| 2010/0201323 | A1 * | 8/2010 | Okamura | H02J 7/0031 320/134 |
| 2010/0237832 | A1 * | 9/2010 | Mack | H02J 7/0026 320/160 |
| 2010/0253285 | A1 | 10/2010 | Takahashi et al. | |
| 2011/0199040 | A1 * | 8/2011 | English | H02J 7/35 320/101 |
| 2011/0227414 | A1 * | 9/2011 | Fischer | H02J 7/0048 307/66 |
| 2012/0126750 | A1 * | 5/2012 | Morina | H02J 7/0013 320/116 |
| 2012/0175953 | A1 * | 7/2012 | Ohkawa | B60L 58/14 307/18 |
| 2012/0217931 | A1 * | 8/2012 | Morina | H02J 7/0013 320/116 |
| 2013/0063080 | A1 * | 3/2013 | Shiraishi | H02J 7/0014 320/107 |
| 2013/0069598 | A1 * | 3/2013 | Tanaka | B60L 50/64 320/134 |
| 2013/0099720 | A1 * | 4/2013 | Chuah | H02J 7/00716 320/101 |
| 2014/0232324 | A1 * | 8/2014 | Readio | H02J 7/007 320/107 |
| 2015/0102767 | A1 * | 4/2015 | Dai | H02J 7/007 320/107 |
| 2015/0137769 | A1 * | 5/2015 | Chen | H02J 7/00 320/157 |
| 2015/0274025 | A1 * | 10/2015 | Demure | B60L 1/14 307/10.1 |
| 2016/0013669 | A1 * | 1/2016 | Shiraishi | H02J 7/0021 320/118 |
| 2016/0036258 | A1 * | 2/2016 | Tsutsui | H02J 7/04 320/107 |
| 2016/0064958 | A1 * | 3/2016 | Jung | H02J 7/0091 320/107 |
| 2016/0380441 | A1 * | 12/2016 | Groat | H02J 7/0071 320/107 |
| 2017/0229884 | A1 * | 8/2017 | Tosch | B60L 3/0046 |
| 2017/0271903 | A1 * | 9/2017 | Tian | H02J 7/0069 |
| 2017/0279283 | A1 * | 9/2017 | Kim | H02J 7/0019 |
| 2017/0352926 | A1 * | 12/2017 | Kanomata | H02J 7/007 |
| 2017/0371000 | A1 | 12/2017 | Fukushima et al. | |
| 2018/0048163 | A1 * | 2/2018 | Deng | H02J 7/0071 |
| 2018/0095137 | A1 * | 4/2018 | Yoshioka | G01R 19/16542 |
| 2018/0143256 | A1 * | 5/2018 | Horie | G01R 31/3648 |
| 2018/0203069 | A1 | 6/2018 | Mori | |
| 2018/0186241 | A1 * | 7/2018 | Harvey | B60L 3/0046 |
| 2018/0205234 | A1 * | 7/2018 | Zhang | H02J 7/00718 |
| 2018/0212470 | A1 * | 7/2018 | Leem | H02J 7/0077 |
| 2018/0262027 | A1 * | 9/2018 | Jung | G01R 31/392 |
| 2018/0287414 | A1 * | 10/2018 | Teich | H02J 50/10 |
| 2018/0316208 | A1 * | 11/2018 | Chou | H02J 7/045 |
| 2019/0089166 | A1 * | 3/2019 | Deng | H02J 7/0047 |
| 2019/0123570 | A1 * | 4/2019 | Tian | H01M 10/44 |
| 2020/0059107 | A1 * | 2/2020 | Fukushima | H02J 7/16 |
| 2020/0169094 | A1 * | 5/2020 | Li | H02J 7/045 |
| 2020/0328608 | A1 * | 10/2020 | Song | H02J 7/007192 |
| 2021/0021145 | A1 * | 1/2021 | Uchinohae | H02J 7/0047 |
| 2021/0036539 | A1 * | 2/2021 | Ha | H02J 50/80 |
| 2021/0320515 | A1 * | 10/2021 | Yu | H02J 7/0071 |

FOREIGN PATENT DOCUMENTS

| | | | | |
|---|---|---|---|---|
| JP | 2004-072973 | A | | 3/2004 |
| JP | 2005192383 | A * | 7/2005 | ........... H02J 7/0075 |
| JP | 2007-089301 | A | | 4/2007 |
| JP | 2008-005693 | A | | 1/2008 |
| JP | 2009-044946 | A | | 2/2009 |
| JP | 2010-246625 | A | | 10/2010 |
| JP | 2011-154925 | A | | 8/2011 |
| JP | 2011154925 | A * | 8/2011 | |
| JP | 2013-017314 | A | | 1/2013 |
| JP | 2014-068468 | A | | 4/2014 |
| JP | 5502282 | B2 * | 5/2014 | ........... H02J 7/0013 |
| JP | 5541682 | B2 * | 7/2014 | |
| JP | 2014-217170 | A | | 11/2014 |
| TW | 200522411 | A * | 7/2005 | |
| WO | WO-2016/079964 | A1 | | 5/2016 |
| WO | WO-2017/061066 | A1 | | 4/2017 |

* cited by examiner

MANAGEMENT APPARATUS, ENERGY STORAGE APPARATUS, AND ENERGY STORAGE SYSTEM

CROSS REFERENCE TO RELATED APPLICATIONS

This application is a national stage application, filed under 35 U.S.C. § 371, of International Application No. PCT/JP2018/017275, filed Apr. 27, 2018, which international application further claims priority to and the benefit of Japanese Application No. 2017-090312, filed Apr. 28, 2017; the contents of both of which as are hereby incorporated by reference in their entirety.

BACKGROUND

Technical Field

The technology disclosed in the present description relates to a technology for charging a plurality of energy storage devices connected in series.

Description of Related Art

An assembled battery in which a plurality of energy storage devices are connected in series varies in the cell voltage (state of charge) due to a difference in the characteristics. When the variation in the cell voltage (state of charge) is large, voltages of some of the energy storage devices may become higher than those of other energy storage devices during charge. Reference JP-A-4-331425 describes that charge is interrupted when voltages of some energy storage devices exceed a set value during the charge.

BRIEF SUMMARY

In this description, it is an object to prevent the voltage of an energy storage device from exceeding a protection voltage during charge to thereby continue the charge.

A management apparatus includes a control unit that gives, to a charger, a lowering notification to lower charge voltage when, during charge of a plurality of energy storage devices connected in series, a voltage of any of the plurality of the energy storage devices becomes equal to or higher than a first threshold.

The control unit gives a lowering notification to the charger when the voltage of any of the energy storage devices becomes equal to or higher than the first threshold. Upon receiving the lowering notification, the charger lowers the charge voltage. By lowering the charge voltage, it is possible to suppress an increase in the voltage of the energy storage device whose voltage is equal to or higher than the first threshold, compared with the case where the charge voltage is not lowered. Therefore, it is possible to prevent the voltage of an energy storage device from exceeding a protection voltage, and to continue the charge.

Figure 1:
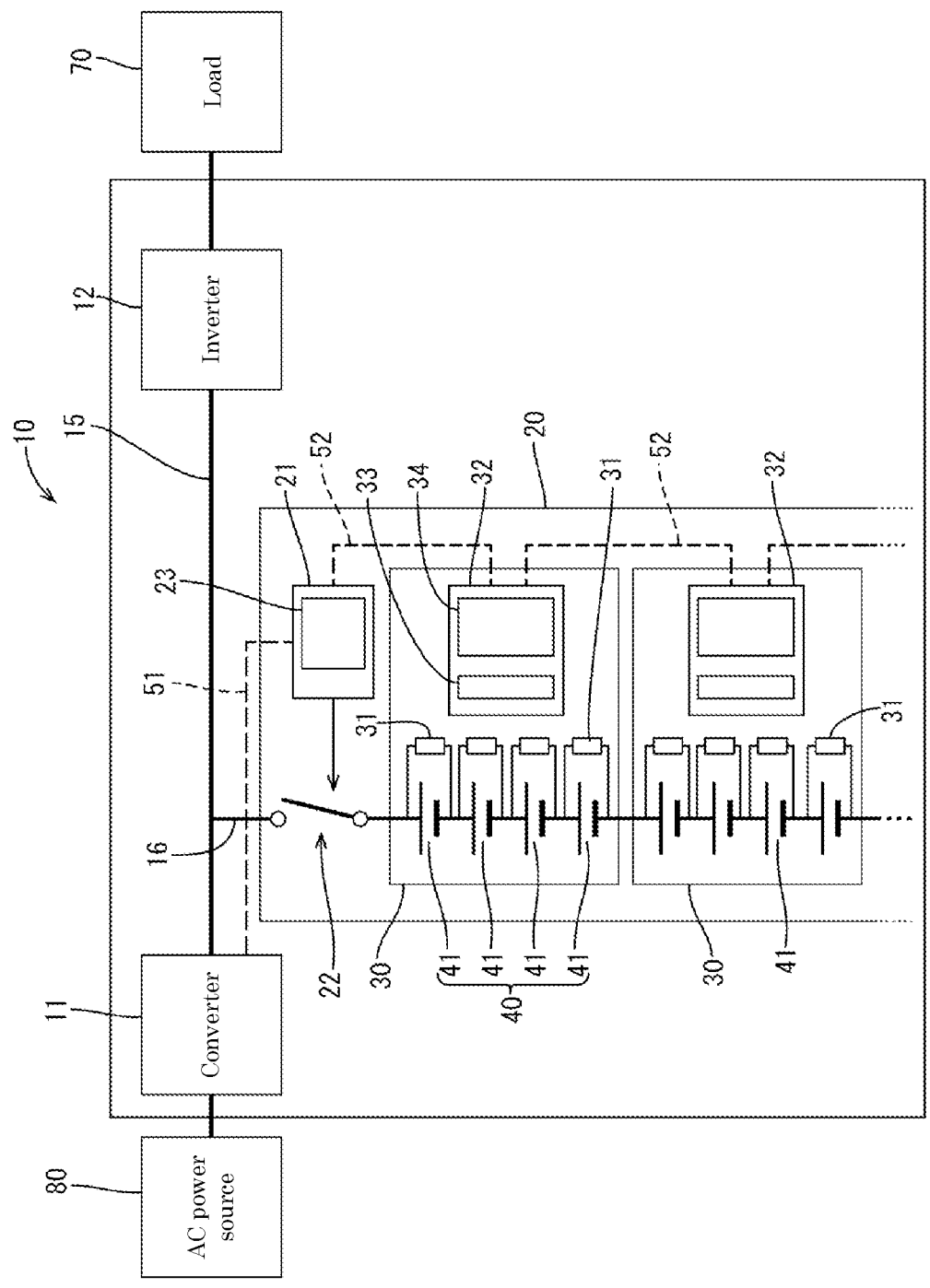
FIG. 1 is a block diagram showing an electrical configuration of a UPS in a first embodiment.

DETAILED DESCRIPTION OF VARIOUS EMBODIMENTS (Outline of the Present Embodiment)
A management apparatus includes a control unit that gives, to a charger, a lowering notification to lower charge voltage when, during charge of a plurality of energy storage devices connected in series, a voltage of any of the plurality of the energy storage devices becomes equal to or higher than a first threshold.

When a plurality of energy storage devices are connected in series and the voltages (states of charge) of the respective energy storage devices vary greatly, the voltage of an energy storage device having a high voltage increases rapidly when being charged by the charger.

The present inventors have examined whether or not it is possible to suppress an increase in the voltage of some energy storage devices when a plurality of energy storage devices are charged.

As a result of examination, the present inventors have considered lowering the charge voltage of the charger when the voltage of any of the energy storage devices becomes equal to or higher than a first threshold. By lowering the charge voltage, it is possible to suppress an increase in the voltage of an energy storage device that is equal to or higher than the first threshold, compared with the case where the charge voltage is not lowered. Therefore, it is possible to prevent the voltage of the energy storage device from exceeding the protection voltage. It is possible to continue the charge while suppressing occurrence of a problem in the energy storage device.

For the energy storage devices, the charger may use the voltages of the respective energy storage devices to control the charge by the total voltage of the energy storage devices, rather than finely controlling the charge so that the voltage of an energy storage device having the highest voltage becomes constant.

In the case where the voltages (states of charge) of the respective energy storage devices vary, when charge is performed by monitoring the total voltage of the energy storage devices, the voltage of an energy storage device having the highest voltage may rise and exceed the protection voltage. When the voltage of any of the energy storage devices becomes equal to or higher than the first threshold, by lowering the charge voltage, it is possible to suppress a rise of the voltage of the electricity energy storage device having the highest voltage to the protection voltage.

When the voltage of any of the energy storage devices is equal to or higher than the first threshold after the charge voltage is lowered, the control unit may give a stepwise lowering notification to the charger to further lower the charge voltage. The control unit may give the stepwise lowering notification a plurality of times to lower the charge voltage in multiple steps. By giving a lowering notification from the control unit to the charger, the charge voltage is lowered, and it is possible to temporarily prevent the voltage of the energy storage device to reach the protection voltage. When the voltage of the energy storage device becomes equal to or higher than the first threshold again after the charge voltage is lowered, the control unit gives a stepwise lowering notification to the charger to further lower the charge voltage. By performing this a plurality of time, it is possible to prevent the voltage of the energy storage device from reaching the protective voltage.

The energy storage device has a low-change area in which a rate of change of the open circuit voltage with respect to a state of charge is relatively low, and a high-change area of a high charge state that is in a state of charge higher than the state of charge of the low-change area and has a relatively high rate of change of the open circuit voltage with respect to the state of charge than that of the low-change area. The first threshold may be included in the high-change area of the high charge state.

The charge speed of the energy storage device is faster as the charge voltage is higher. The present inventors have tried charging of the energy storage devices with a high voltage until the voltage of any of the energy storage devices becomes equal to or higher than the first threshold, by setting the first threshold to a voltage included in the high-change area of a high charge state. The present inventors have found lowering the charge voltage by giving a lowering notification to the charger, after the voltage of any of the energy storage devices becomes equal to or higher than the first threshold. Thereby, compared with the case where the charge voltage is lowered from the beginning, the charge time can be shortened. Further, in the high-change area, the charge capacity change rate is smaller with respect to a change in the open circuit voltage, as compared with that in the low-change area. Therefore, as compared with the case where the first threshold is included in the low-change area, it is possible to maintain the state of charge of the energy storage device in a high charge state while lowering the voltage of the energy storage device.

The control unit may give a restoration notification to restore the charge voltage of the charger to an initial value, when the voltages of all of the energy storage devices are equal to or lower than a second threshold.

By restoring the charge voltage, it is possible to accelerate the charge speed of the energy storage devices. Further, when the assembled battery is to be recharged after discharge, the energy storage devices can be charged with a normal charge voltage, and the charge time can be shortened.

The control unit may inform an abnormality when the charger repeats adjustment of the charge voltage a predetermined number of times or a predetermined period of time or more. By informing abnormality, it is possible to prevent continuous use of the energy storage apparatus that is unsuitable for use.

The control unit may give a restoration notification to restore the charge voltage of the charger to an initial value, when a voltage difference between a plurality of the energy storage devices is equal to or smaller than a predetermined value.

By restoring the charge voltage, it is possible to accelerate the charge speed of the energy storage devices. Further, when the assembled battery is to be recharged after discharge, the energy storage devices can be charged with a normal charge voltage, and the charge time can be shortened.

The control unit may inform an abnormality when the state where the charge voltage is lowered continues for a predetermined period of time or more. By informing abnormality, it is possible to prevent continuous use of the energy storage apparatus that is unsuitable for use.

A discharge circuit for allowing the energy storage device to discharge electricity individually is provided. The control unit may allow the energy storage device having a voltage equal to or higher than a third threshold to discharge electricity by the discharge circuit. By lowering the charge voltage by the charger and allowing the energy storage device to discharge electricity by the discharge circuit, it is possible to further suppress a rise of the voltage of the energy storage device whose voltage is equal to or higher than the third threshold. Without using the third threshold, in the case where the difference between the voltage of each energy storage device and the lowest voltage is equal to or larger than a fourth threshold, the energy storage device may be allowed to discharge electricity by the discharge circuit so that the voltage difference becomes less than the fourth threshold.

The energy storage apparatus includes one or a plurality of energy storage blocks connected in series and a management apparatus. The energy storage block includes a plurality of the energy storage devices connected in series.

The energy storage system includes a charger, the energy storage apparatus, and a charge path that connects the charger and the energy storage apparatus.

For the energy storage devices, the charger may use the voltages of the respective energy storage devices to control the charge by the total voltage of the energy storage apparatus, rather than finely controlling the charge so that the voltage of an energy storage device having the highest voltage becomes constant.

In response to the lowering notification, the charger lowers the charge voltage from the initial value, and the charge voltage after the lowering may be included in the high-change area of the high charge state in terms of a voltage per energy storage device.

Since the charge voltage after the lowering is included in the high-change area in the high charge state when it is converted into a voltage per energy storage device, the charge period of time can be shortened even after the charge voltage is lowered.

A charge control circuit that controls charge of the energy storage apparatus may not be provided on the charge path. The charge voltage can be controlled without using the charge control circuit, and the number of parts can be reduced.

The energy storage system includes the energy storage apparatus connected to a power supply line for supplying electric power from a main power source to a load via a branch line, and a power converter provided on the branch line. The power converter is a bidirectional power converter that converts part of electric power supplied from the main power source and outputs a charge current to the energy storage device, and converts electric power supplied from the energy storage device to output a discharge current to the load. When the voltage of any of the energy storage devices of the energy storage apparatus becomes equal to or higher than the first threshold, the control unit gives the lowering notification to the power converter to lower the charge voltage. Charge can be controlled without stopping the power converter.

The charge method includes, when the voltage of any of the energy storage devices becomes equal to or higher than the first threshold during charge of the energy storage devices connected in series, giving a lowering notification from the management apparatus of the energy storage device to the charger, and a step of lowering the charge voltage by the charger.

First Embodiment

A first embodiment disclosed in the present description will be described with reference to FIGS. 1 to 13.

The present embodiment exemplifies an uninterruptible power system (hereinafter also referred to as "UPS") 10 installed in a facility such as a building, a station, or a hospital. As shown in FIG. 1, the UPS 10 includes a power supply line 15 that connects a load 70 and an AC power source 80 installed in a building or plant (not shown), a converter (an example of "charger") 11, an inverter 12, and an energy storage apparatus 20. The converter 11 and inverter 12 are arranged on the power supply line 15. The uninterruptible power system 10 corresponds to an energy storage system.

The UPS 10 is a constant inverter power supply type UPS. The UPS 10 converts the electric power output from the AC power source 80 from AC to DC by the converter 11, and supplies it to the inverter 12. The inverter 12 converts the electric power supplied from the converter 11 from DC to AC, and supplies it to the load 70.

Part of the DC current output from converter 11 is supplied to the energy storage apparatus 20 as a charge current. The energy storage apparatus 20 is charged with the charge current from the converter 11.

The converter 11 performs charge control on the energy storage apparatus 20 on the basis of the total voltage. The charge control based on the total voltage is charge control that maintains the total voltage of the energy storage apparatus 20 at a target value. Control according to the voltage of each energy storage device 41, such as maintaining the maximum cell voltage of the energy storage device 41 constant, is not performed. The total voltage of the energy storage apparatus 20 is the sum (total voltage) of the voltages of a plurality of energy storage devices 41 connected in series. The energy storage apparatus 20 includes five energy storage blocks 30 connected in series, and each energy storage block 30 includes four energy storage devices 41 connected in series. Therefore, the voltage of the energy storage apparatus 20 is the sum of the voltages of twenty energy storage devices 41 connected in series.

Charge control of the energy storage apparatus 20 by the converter 11 will be described. The converter 11 receives information on the total voltage, information on the capacity such as SOC, and information on the voltage of each energy storage device 41, from the energy storage apparatus 20. When the residual capacity of the energy storage apparatus 20 is small, the converter 11 performs constant current charge control on the energy storage apparatus 20. When the total voltage of the energy storage apparatus 20 reaches a predetermined value by the constant current charge control, the control is switched to constant voltage charge control (charge control based on the total voltage) so as to maintain the total voltage of the energy storage apparatus 20 at a target value. Hereinafter, the voltage of each energy storage device (single cell) is referred to as a cell voltage.

An initial value Yo of the charge voltage Y of the converter 11 (output voltage of the converter) in the constant voltage charge control is expressed by the following equation (1).

$$Yo = Vsel \times N \tag{1}$$

Vsel represents a charge target cell voltage of the energy storage device 41, and is 3.5 [V], for example. N represents the number of energy storage devices 41 in series connection, and it is twenty, for example. The initial value Yo of the charge voltage Y is 3.5×20 [V], for example.

The energy storage apparatus 20 is float-charged, and the converter 11 continues constant voltage charge control and maintains the state of charge of the energy storage apparatus 20 even when the charge current becomes substantially zero at the charge voltage Y. The total voltage of the energy storage apparatus 20 is maintained at the charge voltage Y that is a target value, by the constant voltage charge control. The converter 11 has a function of stopping the charge when the cell voltage of the energy storage device 41 exceeds the protection voltage during the charge. However, it is not desirable to stop the charge.

The energy storage apparatus 20 includes five energy storage blocks 30 connected in series, a battery management apparatus (hereinafter referred to as "BMU") 21 that manages the energy storage blocks 30, and a switch 22. The energy storage apparatus 20 is connected to the power supply line 15 via a branch line 16. The power supply line 15 and the branch line 16 are a charge path and a discharge path of the energy storage apparatus 20. The energy storage apparatus 20 is charged with the charge current from the converter 11. The charge current is supplied from the converter 11 to the energy storage apparatus 20 via the power supply line 15 and the branch line 16. When the AC power source 80 is unable to supply electric power due to an abnormality, the energy storage apparatus 20 supplies electric power to the load 70 via the inverter 12. The battery management apparatus 21 corresponds to the management apparatus.

The switch 22 is a normally closed relay. The switch 22 is provided to disconnect the energy storage apparatus 20 from the power supply line 15 in the case where it is necessary to prohibit the use of the energy storage apparatus 20 such as the case where the energy storage device 41 exceeds the protection voltage.

Each energy storage block 30 includes an assembled battery 40 in which a plurality of (four in this embodiment)

energy storage devices 41 are connected in series, a discharge circuit 31, a battery monitoring device (hereinafter referred to as "CMU") 32, a current sensor and a temperature sensor (not shown), and the like.

The energy storage device 41 is a lithium ion cell including a negative active material of a graphite-based material such as graphite, graphitizable carbon, or non-graphitizable carbon, and an iron phosphate-based positive active material such as lithium iron phosphate. The assembled battery 40 that is a lithium ion battery is formed of four energy storage devices 41 connected in series. In the energy storage apparatus 20, five assembled batteries 40 are connected in series, that is, twenty energy storage devices 41 in total are connected in series.

Figure 3:
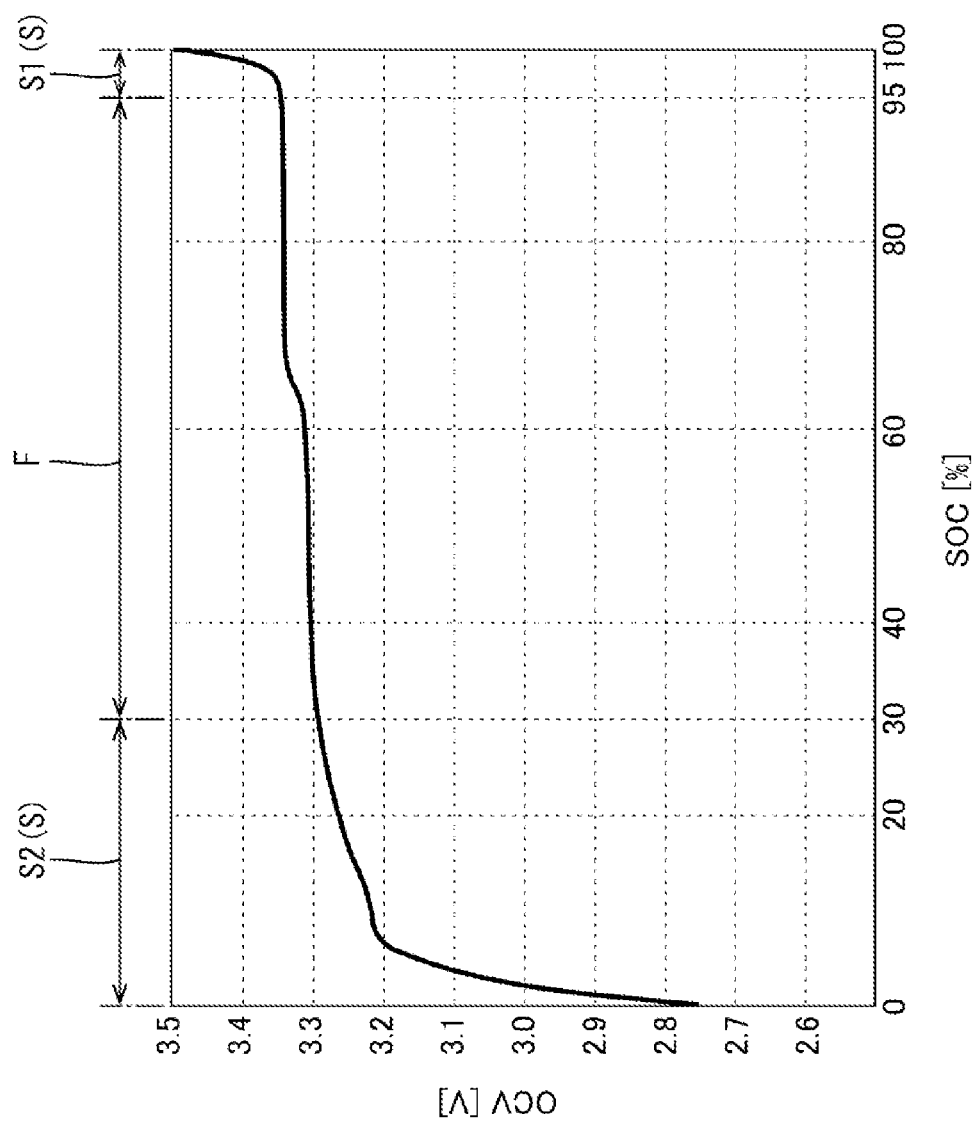
FIG. 3 is a graph showing an SOC-OCV correlation of an assembled battery.

The energy storage device 41 that is a lithium ion cell has a correlation shown in FIG. 3 between the open circuit voltage (OCV) and a state of charge (SOC) (hereinafter referred to as "SOC-OCV correlation"). In the SOC-OCV correlation with SOC [%] on the X axis and OCV [V] on the Y axis, as shown in FIG. 3, a range in which the SOC ranges from 30% to 95% is a flat low-change area F in which the amount of change in the OCV relative to the amount of change in the SOC is smaller than a predetermined value. The low-change area F is a region where the change in the OCV ranges from 2 [mV] to less than 6 [mV] while the SOC changes by 1[%].

A range where the SOC is 95% or more and a range where the SOC is 30% or less are high-change areas S in which the amount of change of the OCV with respect to the amount of change of the SOC is relatively higher than that in the low-change area F. Of the high-change areas S, an area in the high state of charge (area where SOC is 95% or more) in which the SOC is higher than the state of charge in the low-change area F (SOC is in a range from 30% to 95%) is defined as a first high-change area S1. Of the high-change areas S, an area in the low state of charge (area where SOC is 30% or less) in which the SOC is lower than the state of charge in the low-change area F (SOC is in a range from 30% to 95%) is defined as a second high-change area S2. For example, the first and second high-change areas S1 and S2 are areas where the change of the OCV ranges from 2 [mV] to 6 [mV] or more while the SOC changes by 1[%]. As shown in FIG. 3, the first high-change area S1 is an area where the cell voltage is about 3.35 V or higher. The first high-change area S1 is a high-change area in a high state of charge.

$$SOC = Cr/Co \times 100 \quad (2)$$

Co represents the full charge capacity of the energy storage apparatus, and Cr represents the residual capacity of the energy storage apparatus.

Figure 2:
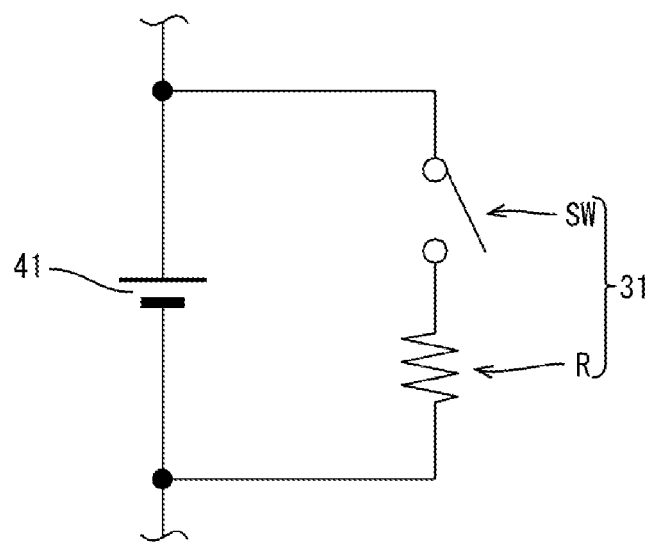
FIG. 2 is a circuit diagram of a discharge circuit.

As shown in FIGS. 1 and 2, the discharge circuit 31 is provided to each energy storage device 41. The discharge circuit 31 is a circuit in which a discharge resistor R and a discharge switch SW are connected in series. Each discharge circuit 31 is in parallel with each energy storage device 41. The discharge circuit 31 switches the discharge switch SW from open to close according to a command from a CMU 32, to thereby allow the energy storage device 41 discharge electricity individually.

The CMU 32 includes a voltage detection circuit 33 and a sub control unit 34. The voltage detection circuit 33 measures the cell voltage of each energy storage device 41 and the battery voltage of the assembled battery 40 (total voltage of the four energy storage devices 41), and outputs the measured voltage to the sub control unit 34. The sub control unit 34 switches of the discharge switch SW of the discharge circuit 31 and outputs the measured values of the cell voltage of each energy storage device 41 and the battery voltage of the assembled battery 40, to the BMU 21.

The BMU 21 is communicably connected to the converter 11 via a first communication line 51. Further, the BMU 21 is also communicably connected to the CMU 32 of each energy storage block 30 via a second communication line 52. For communication between the BMU 21 and the converter 11 and communication between the BMU 21 and the CMU 32, various types of communication methods such as CAN, LIN, RS232C, and RS485 may be adopted.

The BMU 21 includes a main control unit 23. The main control unit 23 is an example of a control unit. The main control unit 23 monitors an output from a CMU 32 of each energy storage block 30. When the voltage of any of the energy storage devices 41 of the energy storage apparatus 20 exceeds the protection voltage, the BMU 21 transmits a signal to the switch 22 and switches the switch 22 from close to open. When the switch 22 is switched, the energy storage apparatus 20 is disconnected from the power supply line 15, whereby a problem is prevented from occurring in the energy storage device 41 (assembled battery 40). The protection voltage is a cell voltage that may cause a problem in the energy storage device 41, and it is desirable to prohibit the use thereof by the energy storage device 41. The protection voltage is 4.0 [V], for example.

The main control unit 23 performs an equalization process when there is a variation in the voltage between the respective energy storage devices 41. The equalization process is a process of allowing the high-voltage energy storage device 41 to be discharged by the discharge circuit 31. By the equalization process, the voltage difference between the respective energy storage devices 41 is reduced, and a variation in the charge capacity between the energy storage devices 41 is equalized. The equalization process can be performed for each energy storage block 30.

Unlike a lead-acid battery, in a lithium ion cell, the cell voltage tends to increase in a high state of charge (high SOC). When the converter 11 performs charge control on the energy storage apparatus 20 on the basis of the total voltage of the energy storage apparatus 20 rather than finely controlling the charge so that the cell voltage of an energy storage device having the highest voltage becomes constant with use of the cell voltage of each energy storage device 41, a problem described below is caused. Even if the total voltage of the energy storage apparatus 20 maintains the charge voltage Y, there is a voltage difference between the respective energy storage devices 41, and the cell voltages of some of the energy storage devices 41 may rise higher than expected. In particular, if a variation in the cell voltage (state of charge) between the energy storage devices 41 is large, the cell voltage of the energy storage device 41 having a high charge rate may suddenly rise in the range of the first high-change area S1 in the last stage of the charge. In order to eliminate the variation in the cell voltage between the energy storage devices 41, even if the equalization process is performed, discharge may not catch up with the voltage rise, and the cell voltage of the energy storage device 41 with a high charge rate may exceed the protection voltage.

When the cell voltage of the energy storage device 41 exceeds the protection voltage, the energy storage apparatus 20 is disconnected from the power supply line 15 by the switch 22. When disconnection from the power supply line 15 occurs, neither charge from the converter 11 to the energy storage apparatus 20 nor discharge from the energy storage apparatus 20 to the inverter 12 is possible.

The main control unit 23 of the BMU 21 of the present embodiment executes a voltage management process to continue constant voltage charge control by the converter 11, while preventing the cell voltage of each energy storage device 41 from reaching the protection voltage.

A voltage management process will be described with reference to FIGS. 4 and 5.

Figure 4:
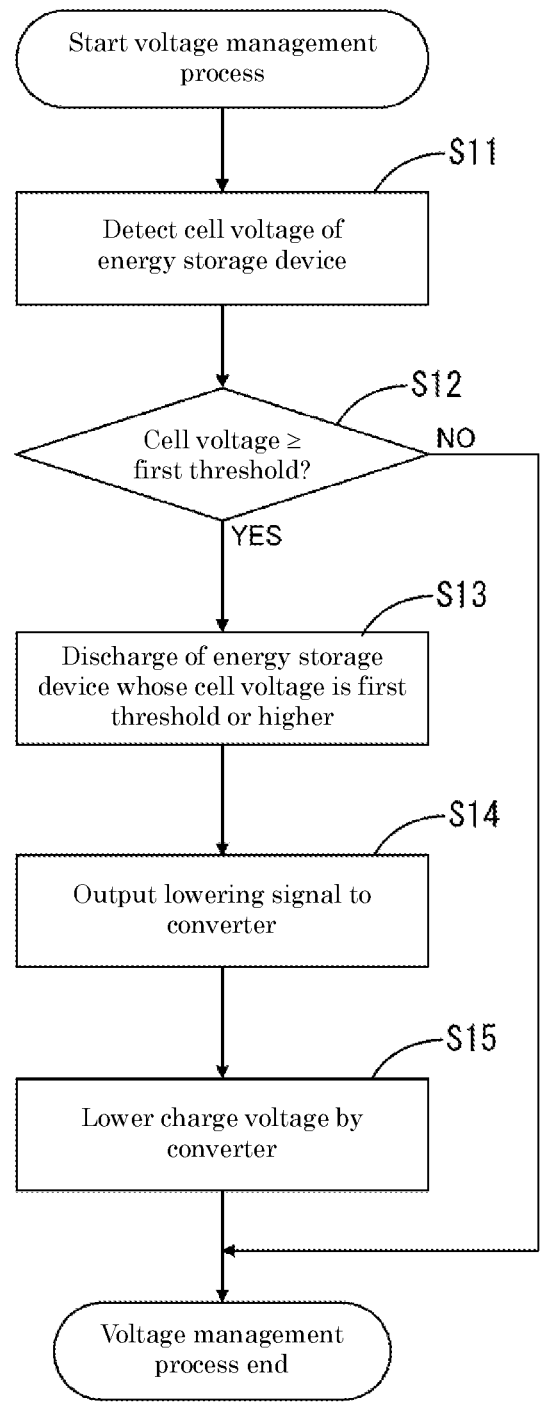
FIG. 4 is a flowchart of a voltage management process.

FIG. 4 is a flowchart showing the flow of a voltage management process. A voltage management process is executed constantly or periodically during the charge of the energy storage apparatus 20.

In the voltage management process, first, the sub control unit 34 of the CMU 32 in each energy storage block 30 of the energy storage apparatus 20 detects the cell voltage of each energy storage device 41 from an output of the voltage detection circuit 33. After detecting the cell voltage, the sub control unit 34 outputs the detection result to the main control unit 23 of the BMU 21 (S11).

The main control unit 23 of the BMU 21 compares the input cell voltage of each energy storage device 41 with the first threshold stored in advance in the main control unit 23 (S12). As a result of the comparison, when the cell voltages of all of the energy storage devices 41 of the energy storage apparatus 20 are lower than the first threshold (S12: NO), the voltage management process ends. The first threshold is a charge voltage upper limit value that may degrade the performance of the energy storage device 41. The charge voltage upper limit value is a voltage upper limit value of the energy storage device 41 in a state of charge.

The first threshold is a voltage included in the first high-change area 51, and is 3.7 [V], for example.

The magnitude relationship among the charge target cell voltage, the first threshold, and the protection voltage is as follows.

$$\text{Charge target cell voltage} < \text{first threshold} < \text{protection voltage} \quad (3)$$

As a result of comparison, when the cell voltage of any of the energy storage devices 41 of the energy storage apparatus 20 is equal to or higher than the first threshold (S12: YES), the main control unit 23 outputs a signal to the sub control unit 34 so as to allow the energy storage device 41 whose cell voltage is equal to or higher than the first threshold to be discharged. The sub control unit 34 to which the signal is input allows the energy storage device 41 whose cell voltage is equal to or higher than the first threshold to discharge electricity by the discharge circuit 31 (S13).

At the same time as S13, the main control unit 23 outputs a first lowering signal for lowering the charge voltage Y from the initial value Yo, to the converter 11 (S14). The converter 11 to which the first lowering signal is input lowers the charge voltage Y from the initial value Yo by a predetermined value (S15), and continues constant voltage charge control. The first lowering signal output from the main control unit 23 to the converter 11 corresponds to a lowering notification.

By lowering the charge voltage Y, the cell voltage of the energy storage device 41 that is equal to or higher than the first threshold can be lowered to a value lower than the first threshold. Thereby, it is possible to continue the charge while preventing the voltage of the energy storage device 41 from exceeding the protection voltage.

Figure 5:
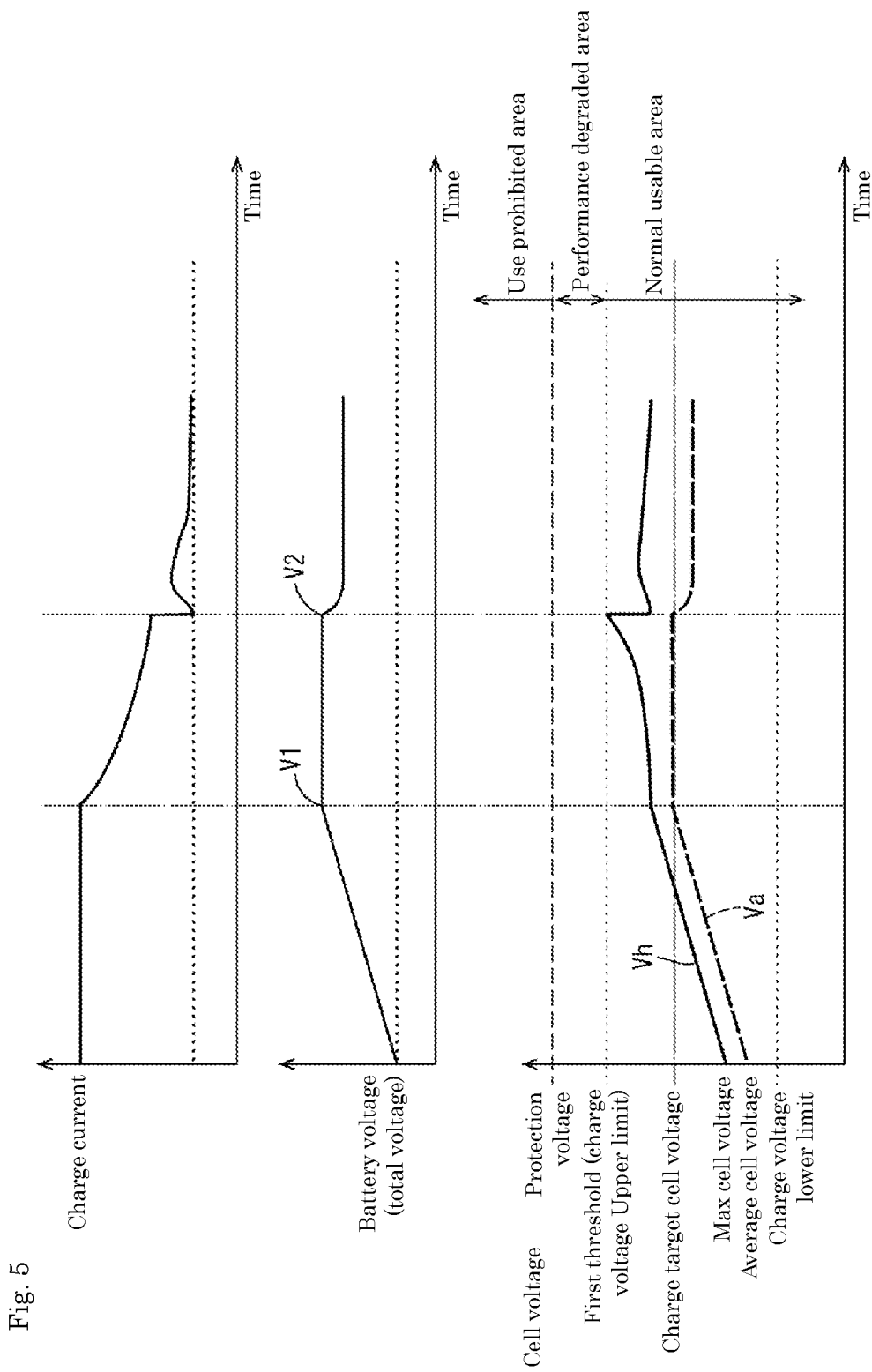
FIG. 5 is a graph showing changes in the cell voltage of an energy storage device, in the battery voltage of an assembled battery, and in the charge current, during constant current constant voltage charge.

FIG. 5 shows a waveform of the cell voltage of the energy storage device 41, a waveform of the battery voltage of the assembled battery 40, and a waveform of the charge current, in the constant current constant voltage charge.

The converter 11 performs constant current charge control on the energy storage apparatus 20 after the start of charge. When the total voltage of the energy storage apparatus 20 reaches a predetermined voltage value (see V1 in FIG. 5), the converter 11 switches the control from the constant current charge control to the constant voltage charge control. After the control is switched to the constant voltage charge control, the energy storage apparatus 20 is charged with the charge voltage Y by the converter 11. When the control is switched to the constant voltage charge control, the charge current of the energy storage apparatus 20 gradually decreases.

After the control is switched to the constant voltage charge control, the average cell voltage (broken line Va) of the energy storage apparatus 20 is maintained near the charge target cell voltage. When the variation in the cell voltage (state of charge) between the energy storage devices 41 is large, the maximum cell voltage (solid line Vh) of the energy storage device 41 rises and reaches the first threshold. The average cell voltage Va is an average cell voltage of all of the energy storage devices 41 constituting the energy storage apparatus 20. The highest cell voltage Vh is a cell voltage of the energy storage device having the highest voltage among all of the energy storage devices 41 constituting the energy storage apparatus 20.

When the highest cell voltage Vh of the energy storage device 41 reaches the first threshold, the energy storage device 41 whose voltage is equal to or higher than the first threshold is allowed to discharge electricity by the discharge circuit 31. At the same time, a first lowering signal is output from the main control unit 23 to the converter 11. The converter 11 lowers the charge voltage Y from the initial value Yo (V2 in FIG. 5).

Through lowering of the charge voltage Y and discharge, it is possible to prevent the highest cell voltage Vh of the energy storage device 41 from becoming the first threshold or higher. Therefore, it is possible to continue the charge while preventing the voltage of the energy storage device 41 from exceeding the protection voltage.

A difference between the UPS 10 of the first embodiment and a UPS 400 of another charge control method will be described.

Figure 22:
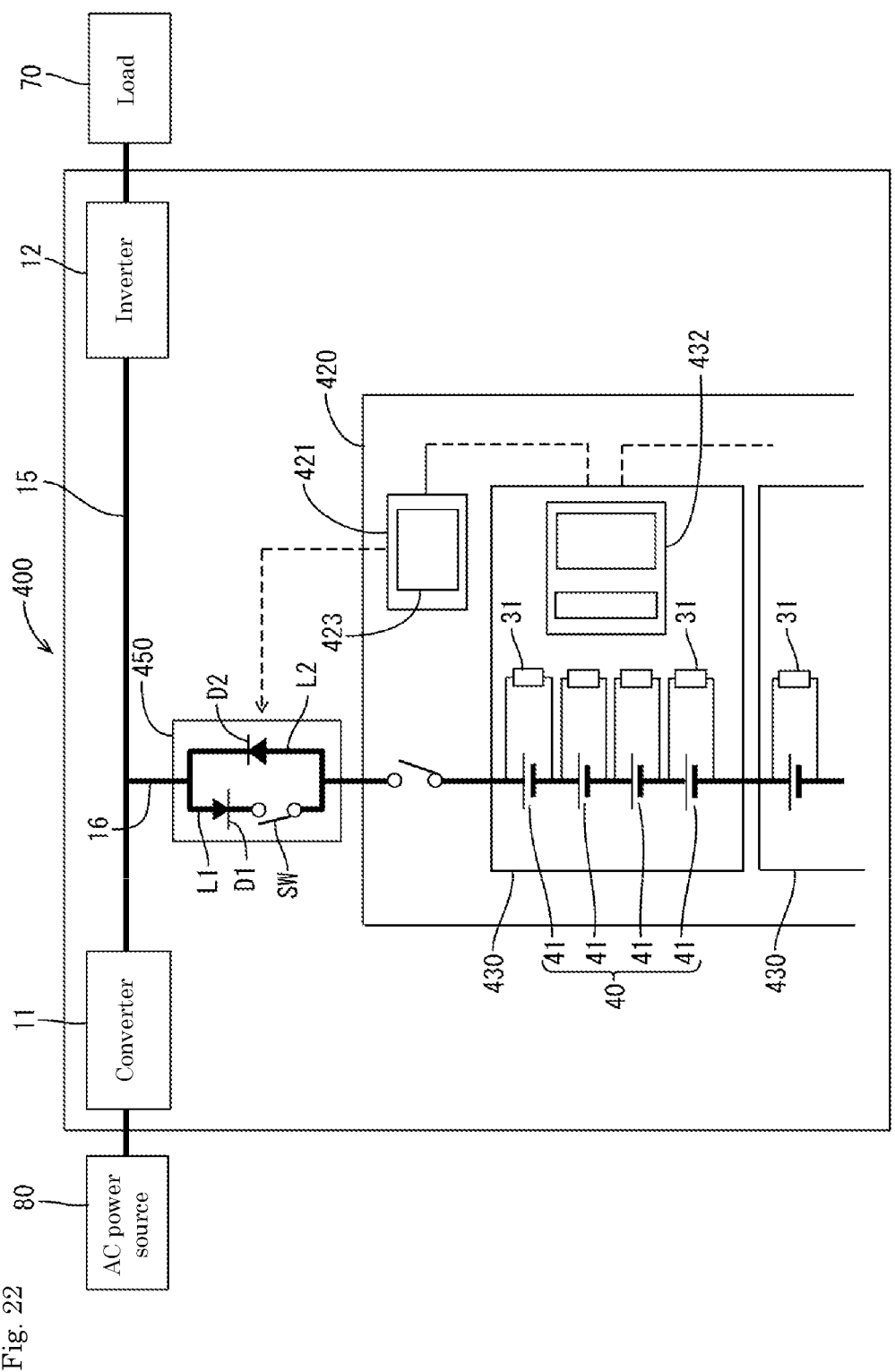
FIG. 22 is a diagram showing a UPS of another charge control method.

FIG. 22 is a circuit diagram of the UPS 400 of another charge control method. The UPS 400 includes the converter 11, the inverter 12, an energy storage apparatus 420, and a charge control circuit 450. The energy storage apparatus 420 includes a plurality of energy storage blocks 430 connected in series and a BMU 421. The energy storage apparatus 420 is connected to the power supply line 15 from the AC power source 80 to the load 70 via the branch line 16. The charge control circuit 450 is provided on the branch line 16.

The charge control circuit 450 includes a first path L1, a second path L2, a first diode D1, a switch SW, and a second diode D2. The first path L1 and the second path L2 are connected in parallel. The charge direction of the first diode D1 is a forward direction. The first diode D1 and the switch SW are connected in series and are provided on the first path L1. The discharge direction of the second diode D2 is a forward direction. The second diode D2 is provided on the second path L2.

The first path L1 is a path for charge of the energy storage apparatus 420. The second path L2 is a path for discharge of the energy storage apparatus 420. The switch SW is a switch that controls charge to the energy storage block 430. On the basis of the output of the CMU 432, the control unit 423 of the BMU 421 monitors the cell voltage of each energy storage device 41 and switches the switch SW between close and open to thereby allow the energy storage apparatus 420 to be charged within the normal usable area (see FIG. 5).

As described above, the UPS 10 of the first embodiment outputs a first lowering signal from the energy storage apparatus 20 to the converter 11 to lower the charge voltage Y when the cell voltage of any of the energy storage devices 41 becomes equal to or higher than the first threshold. Therefore, the energy storage apparatus 20 can be charged within the normal usable area (see FIG. 5) without controlling the charge by using the charge control circuit 450. As shown in FIG. 1, the UPS 10 of the first embodiment does not include the charge control circuit 450 that controls the charge of the energy storage apparatus 20 on the branch line 16 that is a charge path. As compared with the UPS 400, the UPS 10 of the first embodiment has an advantage that the charge control circuit 450 can be eliminated and the number of parts can be reduced.

The charge speed will be described.

As a means for continuing charge while preventing the voltage of the energy storage device 41 from exceeding the protection voltage, there is a method of setting the charge voltage Y of the energy storage apparatus 20 by the converter 11 to the charge voltage after the charge voltage is lowered from the beginning.

The present inventors examined the characteristics by changing the charge voltage Y, and found that the charge speed (SOC increase rate) of the energy storage device 41 was faster (larger) as the charge voltage was higher.

Figure 6:
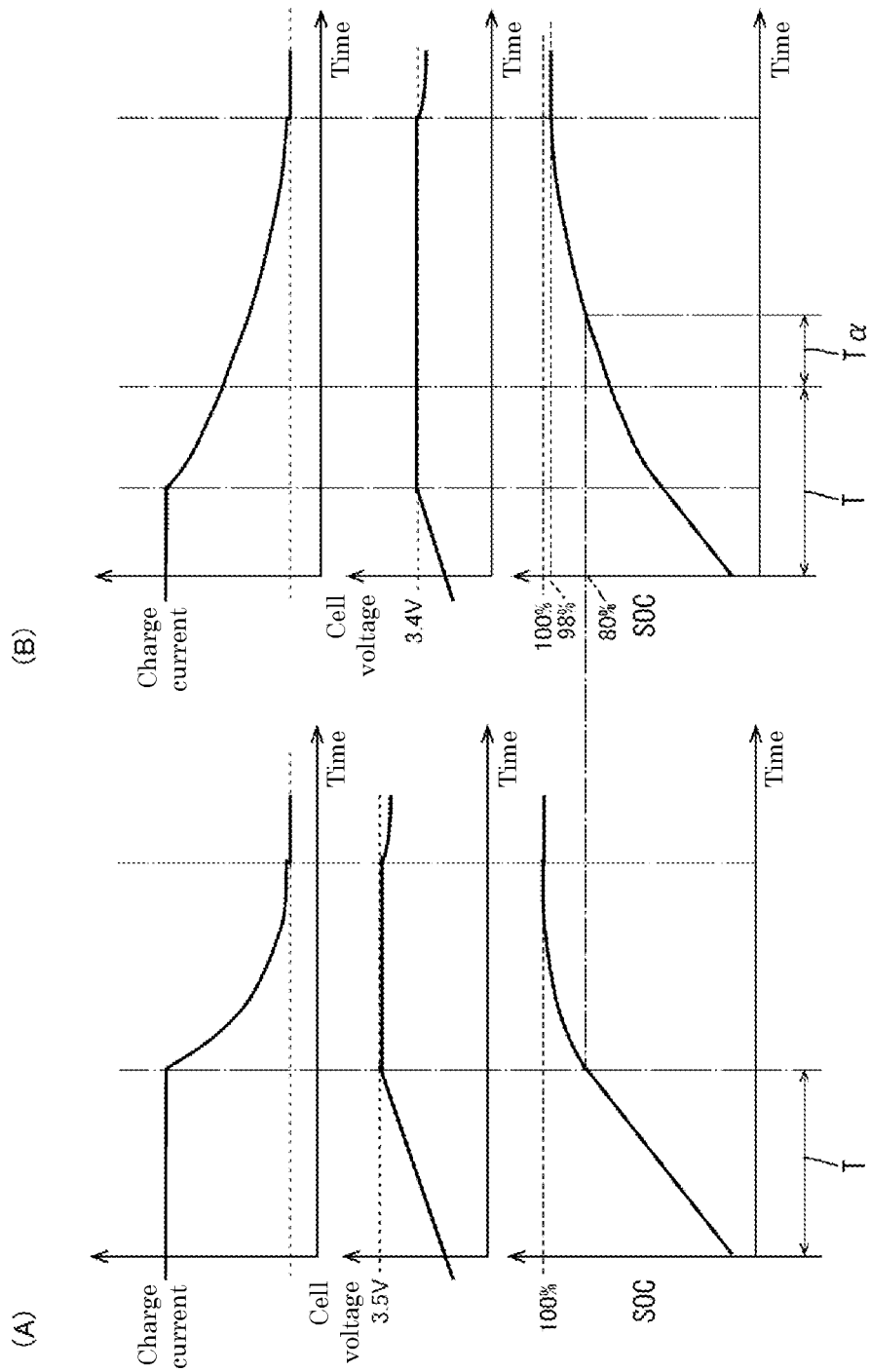
FIG. 6 is a diagram showing charge characteristics when charge voltages are different.
Figure 7:
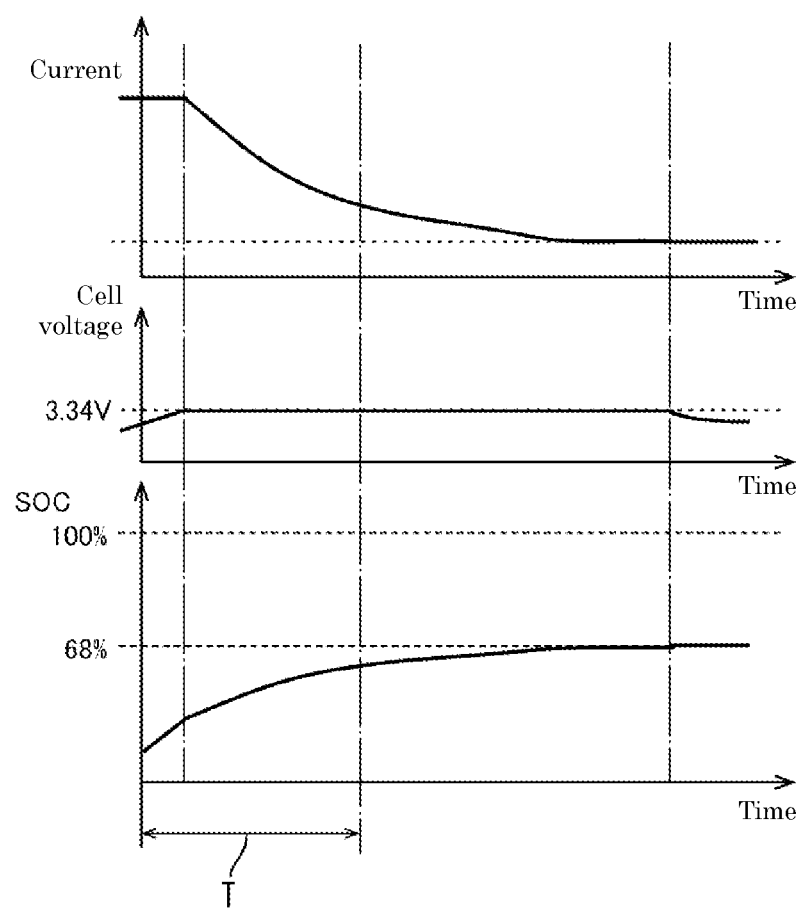
FIG. 7 is a graph showing charge characteristics when the charge voltage is included in a low-change area.

FIGS. 6 and 7 show the waveform of a cell voltage, SOC, and the waveform of a charge current of the energy storage device 41 during constant current constant voltage charge when the charge voltage Y is different.

(A) of FIG. 6 shows data when the energy storage apparatus 20 is subjected to constant voltage control with the charge voltage Y set to 3.5×N [V] so that the average cell voltage of the energy storage device 41 becomes 3.5 [V]. (B) of FIG. 6 is data when the energy storage apparatus 20 is subjected to constant voltage charge control with the charge voltage Y set to 3.4×N [V] so that the average cell voltage of the energy storage device 41 becomes 3.4 [V].

Referring to the SOC increase rate, when the average cell voltage is set to 3.4 [V] ((B) of FIG. 6), the cell voltage tends to hit the upper limit as compared with the case where the average cell voltage is set to 3.5 [V] ((A) of FIG. 6). For the case where the average cell voltage is 3.5 [V], T represents a period of time when the SOC becomes 80%. When the average cell voltage is 3.4 [V], a period of time that the SOC becomes 80% is T+Tα, which is longer than that of when the average cell voltage is 3.5 [V].

FIG. 7 shows a state of constant voltage charge control in the low-change area F (average cell voltage of the energy storage device 41 is 3.34 [V]). FIG. 7 shows the waveform of the cell voltage of the energy storage device 41, the SOC, and the waveform of the charge current, when the constant voltage charge control is performed so that the average cell voltage of the energy storage device 41 becomes 3.34 [V]. 3.34 [V] is a voltage included in the low-change area F. When the average cell voltage of the energy storage device 41 is set to 3.34 [V], the amount of change of the SOC with respect to the amount of change of the OCV is very large. For this reason, the SOC cannot be maintained at a high level. Furthermore, when the energy storage apparatus 20 is subjected to constant voltage charge control so that the average cell voltage becomes 3.34 [V], even after the elapse of T time (period of time that the SOC becomes 80% in (A) of FIG. 6), the SOC is approximately 68%, and the SOC of the energy storage device 41 cannot be maintained high.

From these results, it can be seen that the SOC increase rate in the energy storage device 41 is larger as the charge voltage Y is higher, and the charge time of the energy storage apparatus 20 can be shortened as the charge voltage Y is higher. In order to keep SOC high, it is preferable that the charge voltage Y of the converter 11 is included in the first high-change area S1 when converted to a cell voltage per energy storage device (charge target cell voltage Vsel). The initial value Yo of the charge voltage Y of the converter 11 is 700 V, which is 3.5V when converted to a cell voltage. Since the first high-change area S1 is 3.35 V or higher, the initial value Yo of the charge voltage Y of the converter 11 is included in the first high-change area S1 when converted to a cell voltage.

Figure 8:
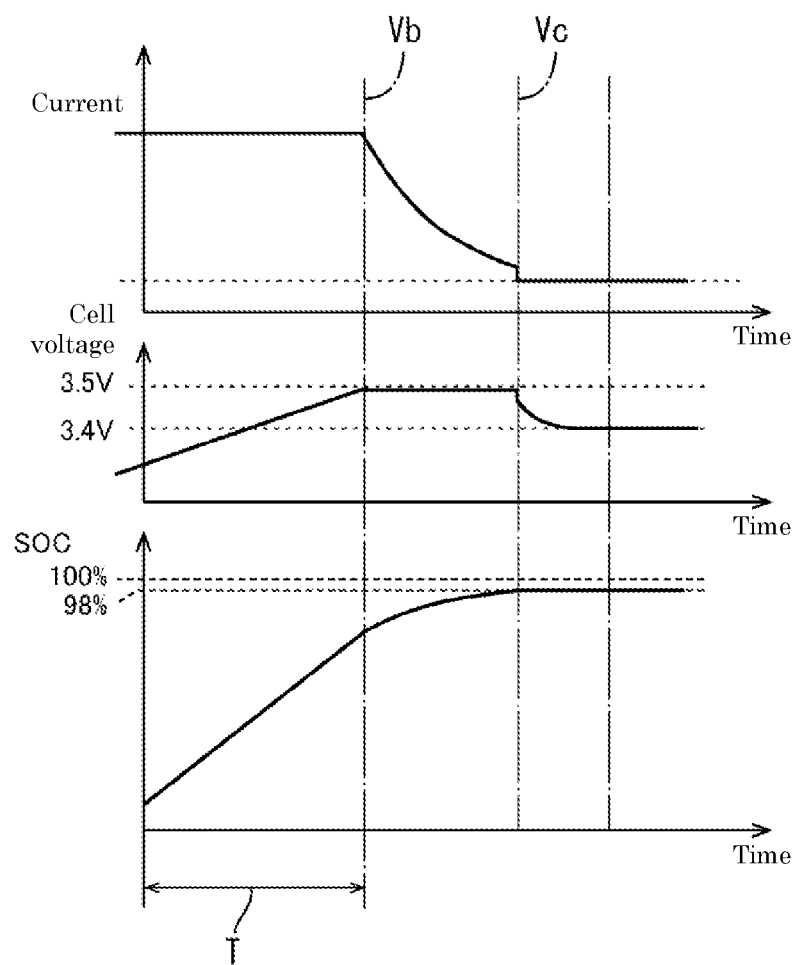
FIG. 8 is a graph showing charge characteristics when the charge voltage is lowered halfway.

As shown in FIG. 8, after the cell voltage of the energy storage device 41 reaches a voltage with a high SOC increase rate (about 3.5 V), by switching the control to constant voltage charge control (Vb in FIG. 8), it is possible to raise the SOC while avoiding an increase of the charge time of the energy storage apparatus 20.

The UPS 10 performs constant voltage charge control of the energy storage apparatus 20 with the charge voltage Y having a high SOC increase rate, and when the cell voltage in any of the energy storage devices 41 of the energy storage apparatus 20 becomes equal to or higher than the first threshold included in the first high-change area 51, the UPS 10 lowers the charge voltage Y to continue the charge. Thereby, it is possible to continue the charge while preventing the voltage of the energy storage devices 41 from exceeding the protection voltage. Furthermore, an increase in the charge time of the energy storage apparatus 20 can be avoided.

In a conventional converter for charging a lead-acid battery, charge control is often performed on the energy storage apparatus 20 on the basis of the total voltage of the energy storage apparatus 20. The energy storage apparatus 20 can also use a conventional converter for charging such a lead-acid battery as a charger. Therefore, it is possible to replace only the energy storage block from a lead-acid battery to a lithium ion cell without replacing the entire UPS 10. After the replacement, the conventional converter for charging the lead-acid battery can be continuously used as it is.

The first threshold is set on the high charge side in the first high-change area 51 so that the charge voltage after the lowering of the charge voltage Y in the converter 11 is included in the first high-change area S1. Therefore, even after the charge voltage Y is lowered, it is possible to suppress a decrease in the SOC increase rate.

In the assembled battery 40 (iron phosphate-based lithium ion battery) used in the energy storage apparatus 20, the cell voltage of the energy storage device 41 in the first high-change area S1 changes more, as compared with the manganese-based or cobalt-based batteries. For this reason, the cell voltage of the energy storage device 41 tends to easily reach the first threshold or the protection voltage. The main control unit 23 sends a lowering signal to the converter 11 to lower the charge voltage Y when the cell voltage of any of the energy storage devices 41 becomes equal to or higher than the first threshold. Thereby, it is possible to prevent the cell voltage of the energy storage device 41 from reaching the first threshold or the protection voltage.

When the AC power source 80 stops, the UPS 10 supplies electric power to the load 70 from the energy storage apparatus 20 via the inverter 12. After electric power is supplied to the load 70, the battery voltage of the assembled battery 40 of each energy storage block 30 is lowered.

When the battery voltage is lowered, the converter 11 starts charge of the energy storage apparatus 20 and performs constant current charge control on the energy storage blocks 30. When the total voltage of the energy storage apparatus 20 reaches a predetermined value, constant voltage charge control is performed so as to maintain the total voltage of the energy storage apparatus 20.

If the charge voltage Y of the converter 11 was lowered from the initial value Yo during the previous charge, the SOC increase rate may be decreased during the constant voltage charge control, and the charge time may be increased.

In order to suppress an increase in the charge time, the UPS 10 executes a charge voltage restoration process as described below.

The charge voltage restoration process will be described with reference to FIGS. 9 and 10.

Figure 9:
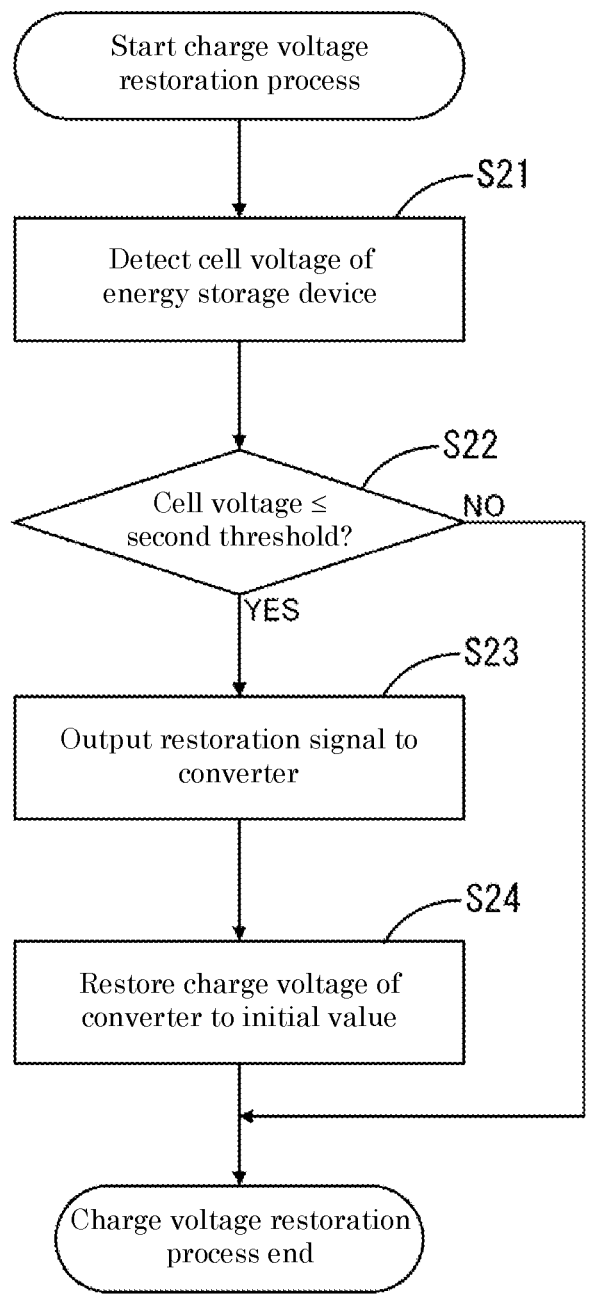
FIG. 9 is a flowchart of a charge voltage restoration process.

FIG. 9 is a flowchart showing a flow of a charge voltage restoration process. The charge voltage restoration process is performed constantly or periodically after the charge voltage Y of the converter 11 is lowered.

In the charge voltage restoration process, first, the sub control unit 34 of the CMU 32 in each energy storage block 30 of the energy storage apparatus 20 detects the cell voltage of each energy storage device 41 from the power of the voltage detection circuit 33. After detecting the cell voltage, the sub control unit 34 outputs the detection result to the main control unit 23 of the BMU 21 (S21).

The main control unit 23 compares the input cell voltage of each energy storage device 41 with the second threshold stored in advance in the main control unit 23 (S22). As a result of comparison, when the cell voltage of any of the energy storage devices 41 is higher than the second threshold (S22: NO), the charge voltage restoration process ends.

The second threshold is a charge voltage lower limit value that the cell voltage of the energy storage device 41 having the highest cell voltage in the energy storage apparatus 20 does not easily become the first threshold or higher even when the charge voltage Y of the converter 11 is restored to the initial value Yo. The charge voltage lower limit value is a voltage lower limit value of the energy storage device 41 in the state of charge.

For example, the second threshold is 3.45 [V].

The magnitude relationship among the second threshold, the charge target cell voltage, the first threshold, and the protection voltage is as provided below.

Second threshold≤charge target cell voltage<first threshold<protection voltage (4)

As a result of comparison, when the cell voltages of all of the energy storage devices 41 are equal to or lower than the second threshold (S22: YES), the main control unit 23 outputs a restoration signal to restore the charge voltage Y to the initial value Yo, to the converter 11 (S23). Upon receiving the restoration signal, the converter 11 restores the charge voltage Y to the initial value Yo (S24). A restoration signal output from the main control unit 23 to the converter 11 corresponds to a restoration notification.

Figure 10:
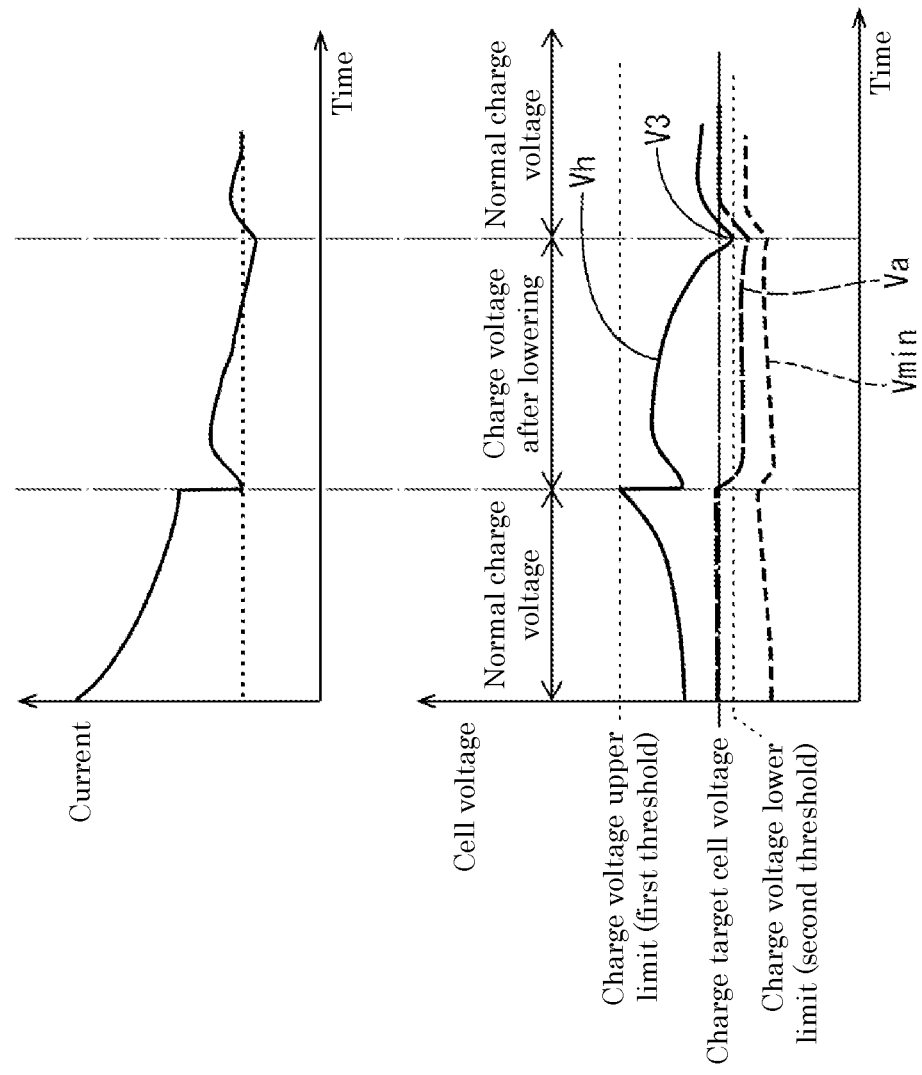
FIG. 10 shows a waveform of cell voltage of an energy storage device and a waveform of charge current.

FIG. 10 shows a waveform of the cell voltage of the energy storage device 41 and a waveform of the charge current when the charge voltage restoration process (S23, S24) is executed. In FIG. 10, the charge voltage Y of the converter 11 is restored from the lowered charge voltage to the initial value Yo (energized charge voltage) at V3 in FIG. 10 where the maximum cell voltage Vh of the energy storage device 41 becomes the second threshold or lower. As a result, the converter 11 is restored to a normal state. Thereby, the energy storage apparatus 20 can be charged without increasing the charge time.

Figure 11:
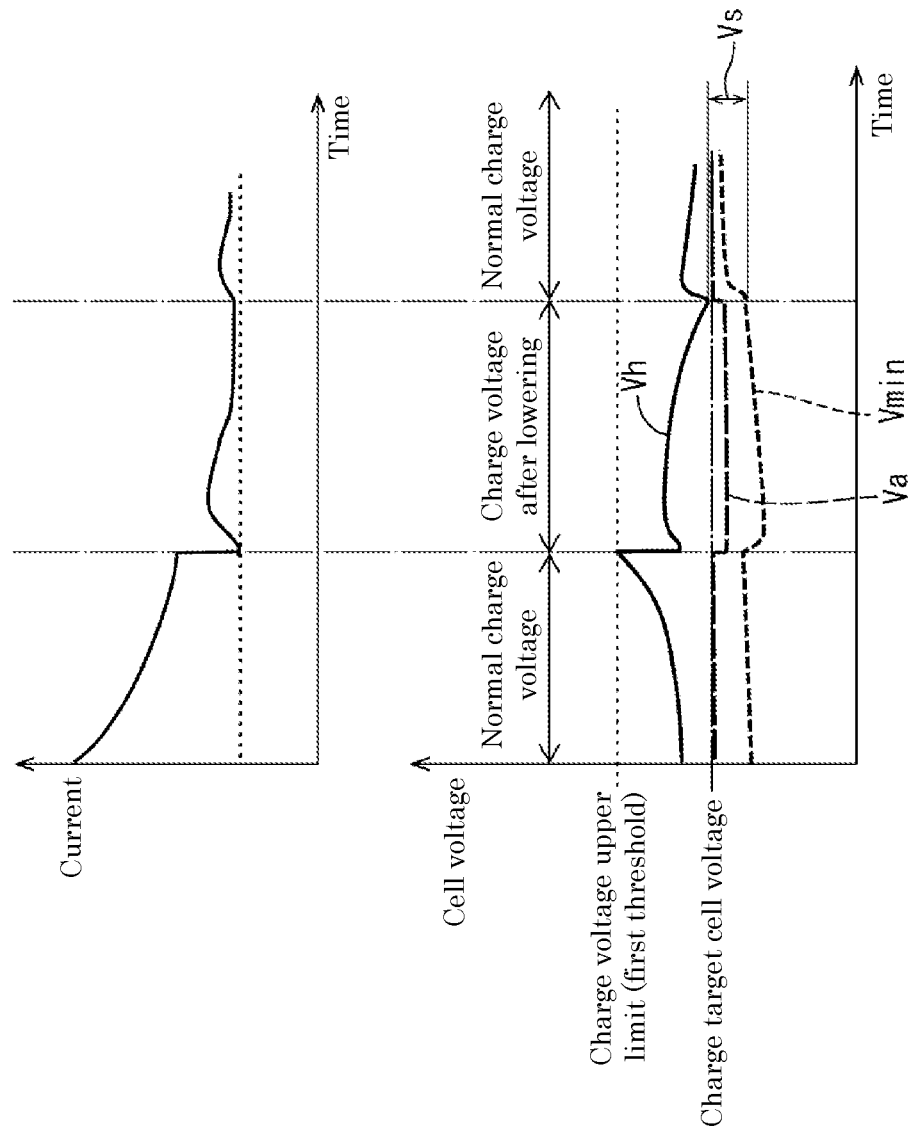
FIG. 11 shows a waveform of cell voltage of an energy storage device and a waveform of charge current.

FIG. 11 shows a waveform of the cell voltage of the energy storage device 41 and a waveform of the charge current during charge. When the voltage difference between the respective energy storage devices 41 is eliminated in the equalization process, the voltage difference between the energy storage devices 41 in each energy storage block 30 may become a predetermined value or smaller after the charge voltage Y is lowered. Therefore, the main control unit 23 detects a voltage difference between the energy storage devices 41 in S22 of the charge voltage restoration process.

The voltage difference between the energy storage devices 41 is, for example, a voltage difference between the highest cell voltage Vh and the lowest cell voltage Vmin. The highest cell voltage Vh is the cell voltage of the energy storage device 41 having the highest cell voltage in the storage block 30. The lowest cell voltage Vmin is the cell voltage of the energy storage device 41 having the lowest cell voltage in the energy storage block 30.

The main control unit 23 may output a restoration signal to the converter 11 when the detected voltage difference is equal to or smaller than the reference potential difference (Vs in FIG. 11) stored in the main control unit 23 for each energy storage block 30. Thereby, the charge voltage Y of the converter 11 can be restored to the initial value Yo.

EXAMPLE

Examples will be described with reference to FIGS. 12 and 13.

This example shows graphs indicating transition of the average cell voltage Va of the energy storage devices 41 and the maximum cell voltage in one energy storage block 30 of the energy storage blocks 30 and the charge voltage Y of the converter 11, in the UPS 10 of the first embodiment. In FIGS. 12 and 13, the left vertical axis represents the cell voltage [V] of the energy storage device 41, the right vertical axis represents the charge voltage [V] or the charge current [A] of the converter 11, and the horizontal axis represents the time (H).

In the full charge state, the voltage of the energy storage device 41 is about 3.5 [V] to 3.7 [V], for example. In the full charge state, the average cell voltage of the energy storage device 41 is 3.5 [V].

Figure 12:
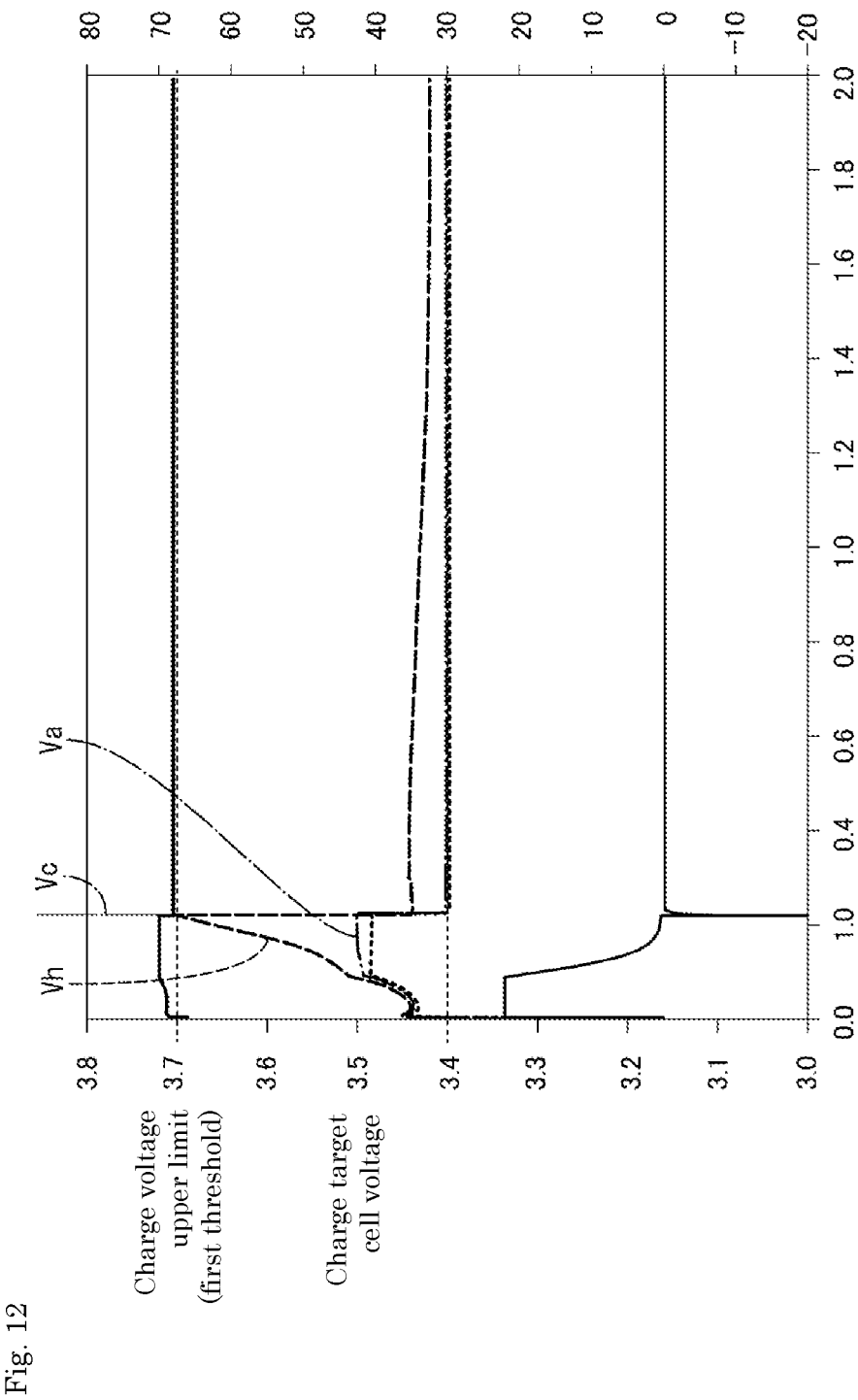
FIG. 12 shows a waveform of cell voltage of an energy storage device, waveform of battery voltage of an assembled battery, and a waveform of charge current.
Figure 13:
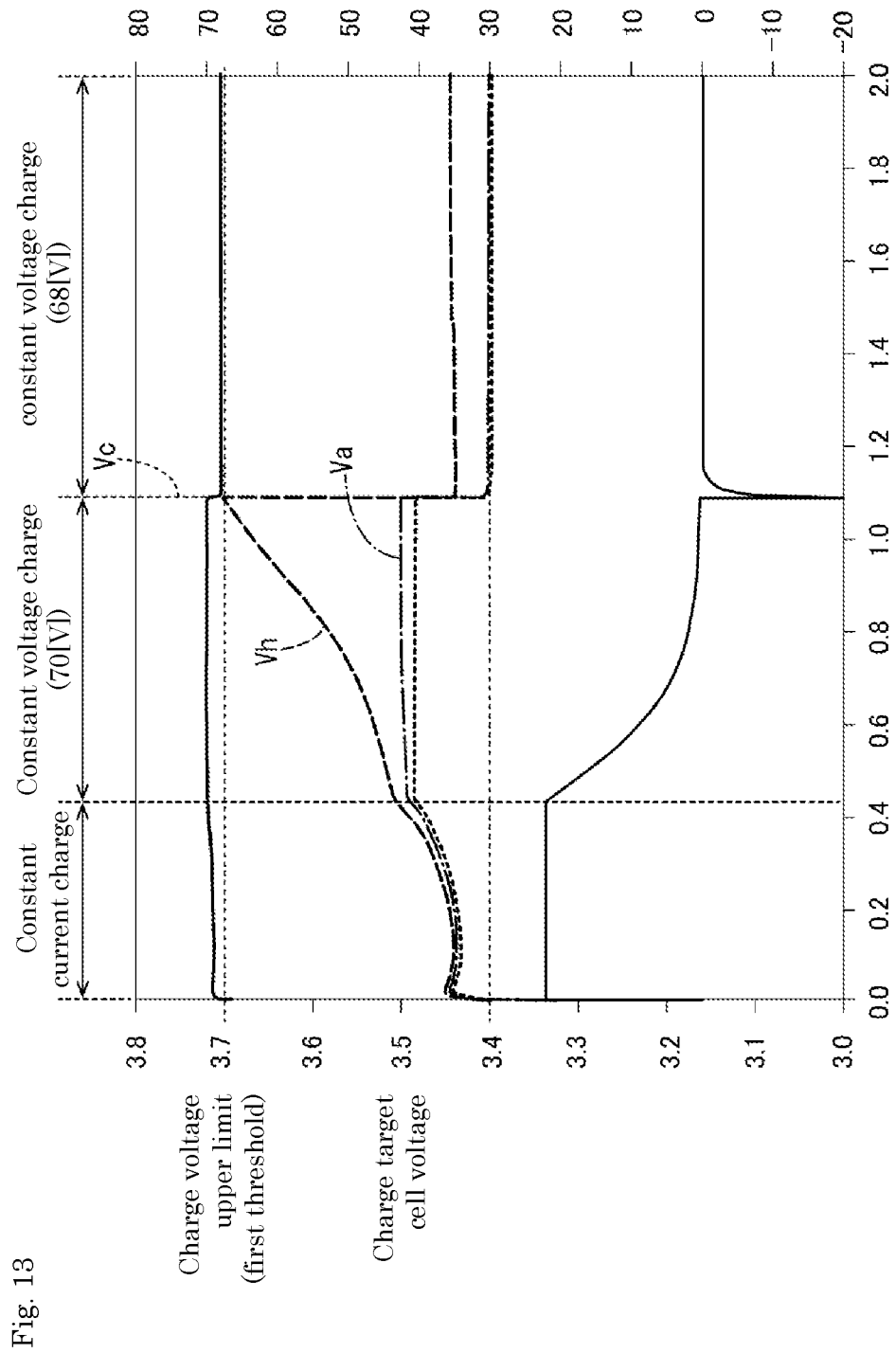
FIG. 13 is an enlarged view of FIG. 10.

In FIGS. 12 and 13, first, charge is performed for about thirty minutes by constant current charge control, and when the total voltage of the energy storage apparatus 20 reaches 70 [V], the control is switched to constant voltage charge control.

In the example of FIG. 12, the charge voltage Y during the constant voltage charge is 70 [V]. During the charge at 70 [V], the average cell voltage (one-dot chain line Va) of the energy storage device 41 is maintained at around 3.5 [V].

Since variation in the cell voltage (state of charge) between the energy storage devices 41 is large, the maximum cell voltage (broken line Vh) of the energy storage device 41 rises and reaches the first threshold.

When the highest cell voltage (broken line Vh) of the energy storage device 41 reaches the first threshold, the main control unit 23 allows, through the sub control unit 34, the energy storage device 41 whose cell voltage is equal to or higher than the first threshold (energy storage device having the highest cell voltage Vh) to discharge electricity by the discharge circuit 31. At the same time, a first lowering signal is output from the main control unit 23 to the converter 11.

In response to the output of the first lowering signal, the converter 11 lowers the charge voltage Y from the initial value Yo of 70 [V] to 68 [V] (Vc in FIGS. 12 and 13).

When the charge voltage is lowered, the average cell voltage Va drops to about 3.4 [V], and the maximum cell voltage Vh drops to around 3.45 [V]. As a result, the maximum cell voltage Vh of the energy storage device 41 is prevented from becoming the first threshold or higher.

Thereafter, the maximum cell voltage Vh of the energy storage device 41 is gradually lowered by the equalization process.

As described with reference to FIGS. 12 and 13, when the cell voltage of any of the energy storage devices 41 becomes equal to or higher than the first threshold included in the first high-change area 51, the UPS 10 of the first embodiment lowers the charge voltage Y to continue the constant voltage charge control on the energy storage apparatus 20. Thus, charge can be continued while suppressing occurrence of problems in each energy storage device 41. In addition, since the first threshold and the charge voltage after lowering the charge voltage are included in the first high-change area 51, it is possible to prevent an increase in the charge period of time of the energy storage apparatus 20 while suppressing a large drop of the total voltage of the energy storage apparatus 20.

Second Embodiment

Next, a second embodiment will be described with reference to FIGS. 14 and 15.

A voltage management process of the second embodiment is a modification of the process after S16 in the voltage management process of the first embodiment. In the second embodiment, since the configurations, operations, and effects common to the first embodiment are duplicated, the description thereof is omitted. Further, the same reference numerals are used for the same configurations as that of the first embodiment.

Figure 14:
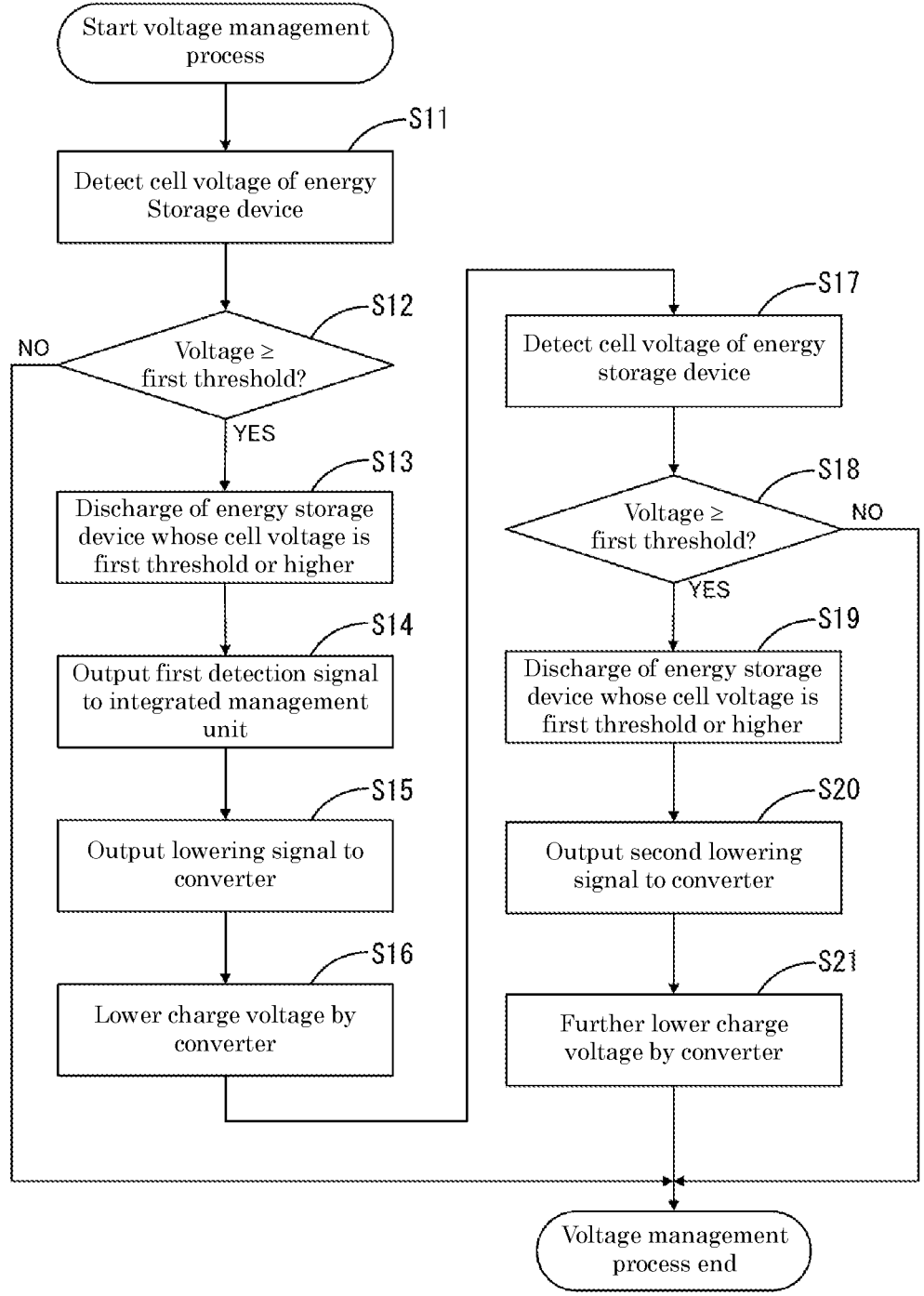
FIG. 14 is a flowchart of a voltage management process in a second embodiment.

In the voltage management process of the second embodiment, as shown in the flowchart of FIG. 14, after the charge voltage Y is lowered by the converter 11 in S16, the main control unit 23 detects the cell voltage of each energy storage device 41 via the sub control unit 34 of the CMU 32 (S17). Then, the first threshold is compared with the cell voltage of each energy storage device 41 (S18).

As a result of comparison, when the cell voltages in all of the energy storage devices 41 are lower than the first threshold (S18: NO), the voltage management process ends. On the other hand, when the cell voltage of any of the energy storage devices 41 becomes equal to or higher than the first threshold again (S18: YES), the main control unit 23 allows the energy storage device 41 having the cell voltage equal to or higher than the first threshold to discharge electricity, via the sub control unit 34 (S19). At the same time, the main control unit 23 outputs a second lowering signal for further lowering the charge voltage Y, to the converter 11 (S20). The converter 11 receives the second lowering signal and further lowers the charge voltage Y (S21). The second lowering signal output from the main control unit 23 to the converter 11 corresponds to a stepwise lowering notification.

Figure 15:
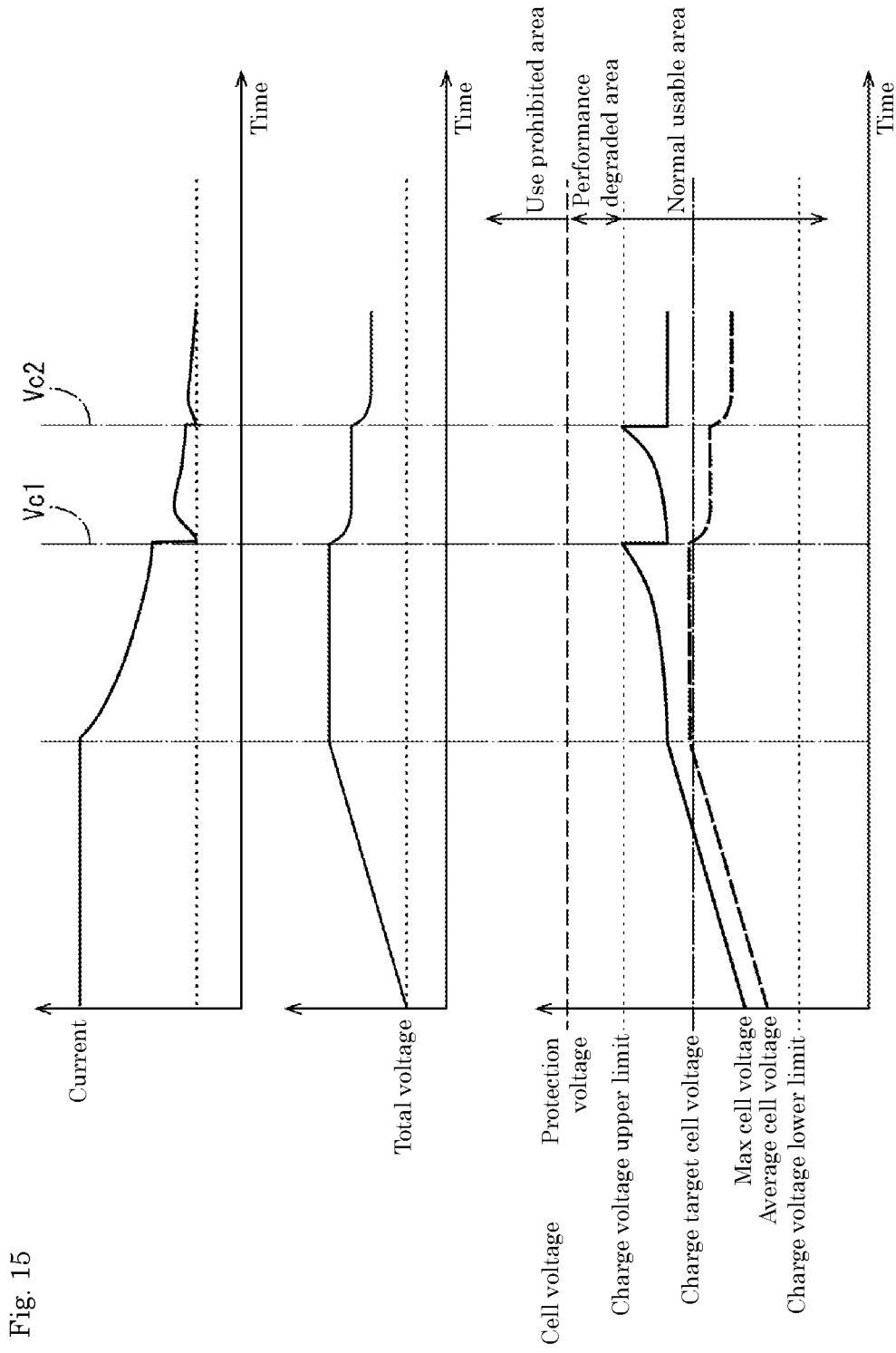
FIG. 15 is a diagram corresponding to FIG. 4 in the second embodiment.

In the voltage management process of the second embodiment, as shown in FIG. 15, the main control unit 23 lowers the charge voltage Y of the converter 11 (Vc1 in FIG. 15), so that it is possible to temporarily prevent the maximum cell voltage of the energy storage device 41 from becoming the first threshold or higher.

Thereafter, when the cell voltage of any of the energy storage devices 41 becomes equal to or higher than the first threshold again, the main control unit 23 transmits the second lowering signal to the converter 11 and lowers the charge voltage Y twice in steps (Vc2 in FIG. 15). Lowering the charge voltage Y in steps can further suppress the voltage of each energy storage device 41 from reaching the first threshold or the protection voltage.

Third Embodiment

Figure 16:
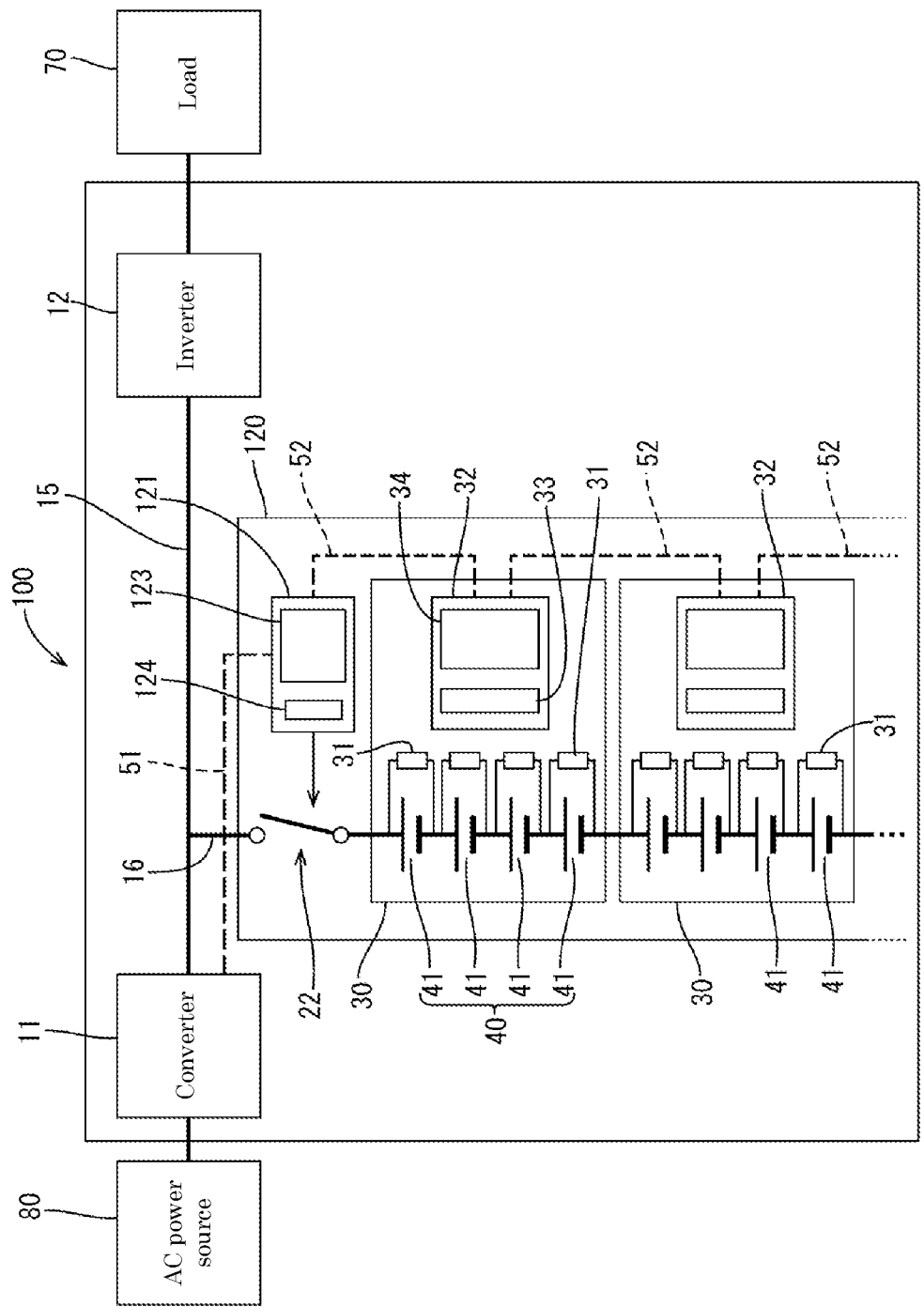
FIG. 16 is a block diagram showing an electrical configuration of a UPS in a third embodiment.

FIG. 16 is a circuit diagram of a UPS 100 according to a third embodiment. The UPS 100 includes a converter 11, an inverter 12, a power supply line 15, and an energy storage apparatus 120. The energy storage apparatus 120 is connected to the power supply line 15 via a branch line 16. The UPS 100 is a constant inverter power supply type UPS, similar to the UPS 10. The UPS 100 is an example of an energy storage system.

As shown in FIG. 16, the energy storage apparatus 120 includes a plurality of energy storage blocks 30, a battery management apparatus (hereinafter referred to as "BMU") 121 that manages the energy storage blocks 30, and a switch 22. The BMU 121 includes a main control unit 123 and a warning lamp 124. The main control unit 123 is an example of a control unit. Each energy storage block 30 includes a plurality of energy storage devices 41 connected in series, and a discharge circuit 31 for each energy storage device 41. In the energy storage apparatus 120, an abnormality detection function is added to the energy storage apparatus 20 of the first embodiment. The battery management apparatus 121 is an example of a management apparatus.

Figure 17:
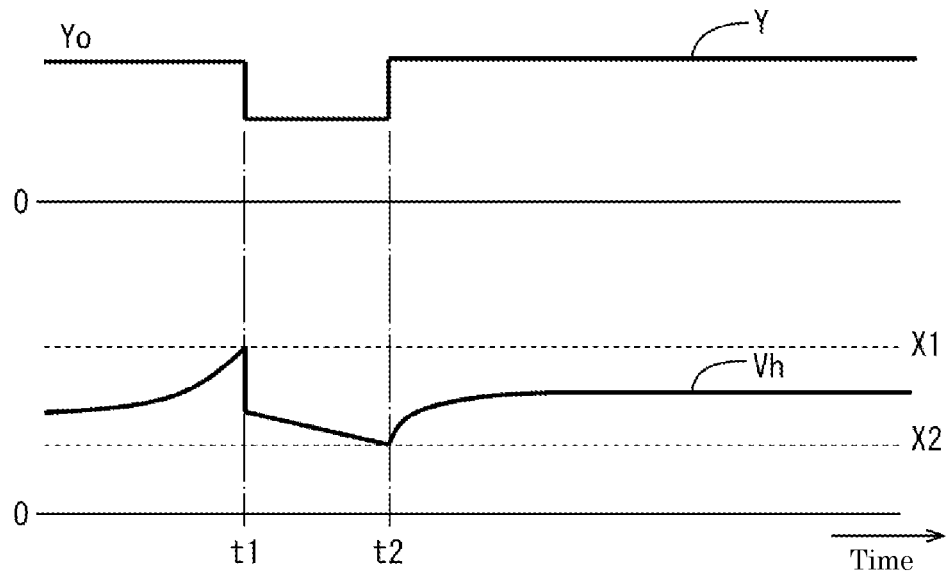
FIG. 17 shows a waveform of charge voltage of a converter and a voltage waveform of an energy storage device.
Figure 18:
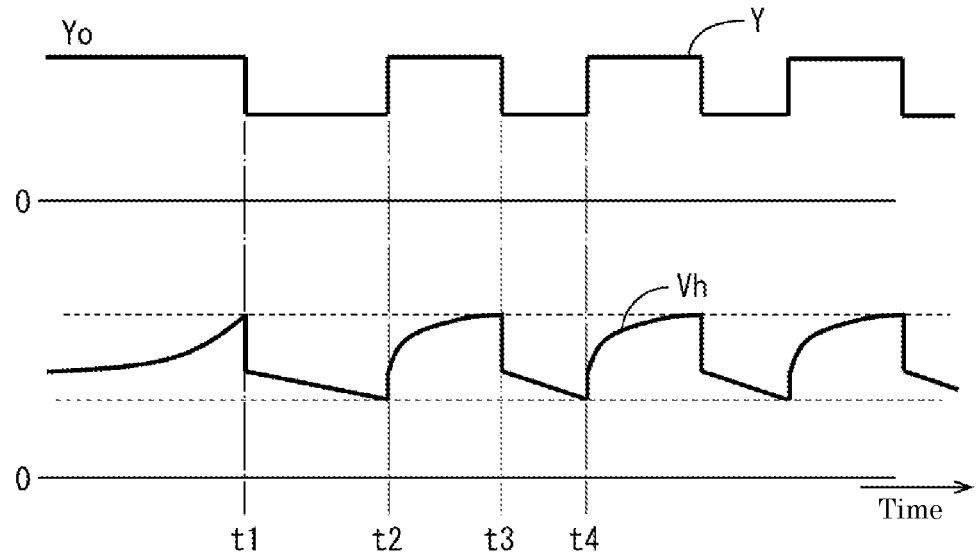
FIG. 18 shows a waveform of charge voltage of a converter and a voltage waveform of an energy storage device.

FIGS. 17 and 18 show a waveform of the charge voltage Y of the converter 11 and a waveform of the highest cell voltage Vh of the energy storage device 41 having the highest cell voltage in the energy storage apparatus 20. As shown in FIG. 17, after starting constant voltage charge, the energy storage apparatus 20 is charged by the converter 11 at the initial value Yo. When the highest cell voltage Vh of the energy storage device 41 reaches a first threshold X1 at time t1, the main control unit 23 transmits the first lowering notification to the converter 11. Upon receiving the first lowering notification, the converter 11 lowers the charge voltage Y from the initial value Yo (S12). Further, at time t1 when the highest cell voltage Vh reaches the first threshold X1, the main control unit 123 allows the energy storage device 41 having the highest cell voltage Vh to be discharged by the discharge circuit 31 (S13). Due to the lowering of the charge voltage Y and the discharge, the maximum cell voltage Vh of the energy storage device 41 drops after time t1.

The main control unit 123 outputs a restoration signal to the converter 11 at time t2 when the highest cell voltage Vh reaches a second threshold X2 (S23). With the output of the restoration signal, the charge voltage Y is restored to the initial value Yo at time t2. When the discharge circuit 31 is operating normally, the energy storage device 41 having the highest cell voltage Vh is discharged after time t1, and the voltage difference ΔV from the voltage of the other energy storage devices 41 decreases with time. Therefore, as shown in FIG. 17, after time t2 when the charge voltage Y is restored to the initial value Yo, the cell voltage of each energy storage device 41 of the energy storage apparatus 20 is settled between the first threshold X1 and the second threshold X2.

FIG. 18 shows a waveform of the charge voltage Y of the converter 11 and a waveform of the maximum cell voltage Vh of the energy storage device 41, when the discharge circuit 31 is not operating normally. As shown in FIG. 18, when the charge voltage Y is lowered from the initial value Yo at time t1, the maximum cell voltage Vh of the energy storage device 41 drops temporarily thereafter. When the discharge circuit 31 is not operating normally, the variation in the cell voltage of the energy storage devices 41 is not eliminated. Therefore, when the charge voltage Y is restored to the initial value Yo at time t2, the maximum cell voltage Vh of the energy storage device 41 having the highest cell voltage may continue to rise and reach the first threshold X1 (time t3). When the maximum cell voltage Vh reaches the first threshold X1 at time t3, the main control unit 23 sends the second lowering notification to the converter 11. Upon receiving the second lowering notification, the converter 11 lowers the charge voltage Y from the initial value Yo again. As described above, when the discharge circuit 31 is not operating normally, the converter 11 repeatedly raises and lowers the charge voltage Y (adjustment of the charge voltage) as shown in FIG. 18.

The main control unit 123 determines whether the converter 11 as a charger repeats adjustment of the charge voltage Y from the output status (frequency or the like) of the first lowering signal and the restoration signal to the converter 11. When the converter 11 repeats adjustment of the charge voltage Y a predetermined number of times or a predetermined period of time or more, the main control unit 123 performs a process of informing abnormality such as displaying a warning lamp 124. With the information of abnormality, the user can be informed of the abnormality.

Figure 19:
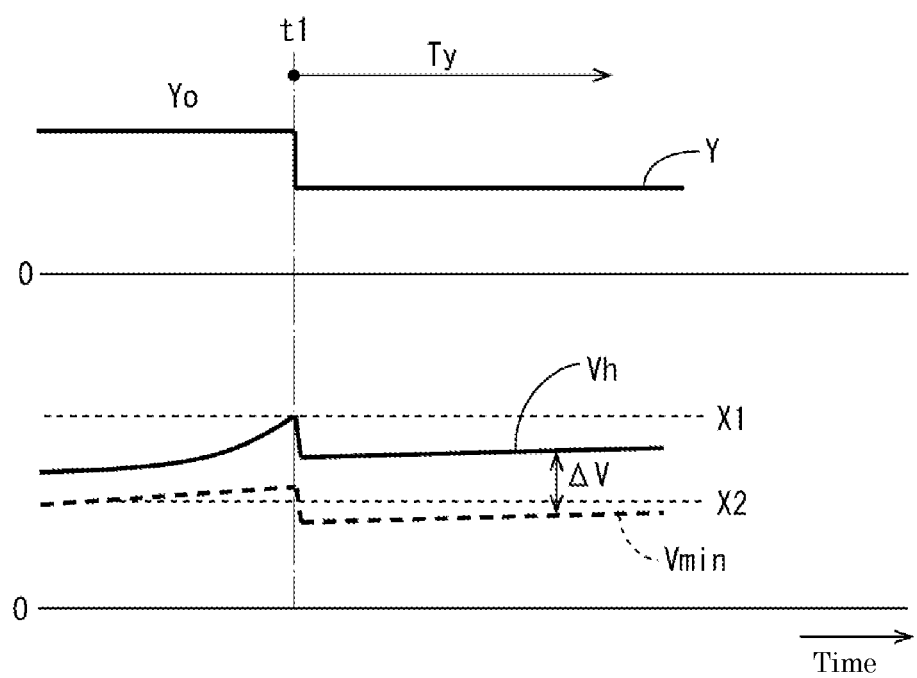
FIG. 19 shows a waveform of charge voltage of a converter and a voltage waveform of an energy storage device.

The condition of restoring the lowered charge voltage Y to the initial value Yo is not limited to the method of comparing the highest cell voltage Vh of the energy storage device 41 with the second threshold X2. A method of comparing the voltage difference ΔV between the energy storage devices 41 with a predetermined value in each energy storage block 30 has been known. For example, the voltage difference ΔV is a voltage difference between the highest cell voltage Vh of the energy storage device 41 and the lowest cell voltage Vmin of the energy storage device 41 in the energy storage block 30. When the discharge circuit 31 is not operating normally, as shown in FIG. 19, even if the converter 11 lowers the charge voltage Y from the initial value Yo at time t1, the voltage difference ΔV between the maximum cell voltage Vh and the minimum cell voltage Vmin is not eliminated. Therefore, a state where the voltage difference ΔV between the highest cell voltage Vh and the lowest cell voltage Vmin is higher than a predetermined value continues, and a state where the charge voltage Y is lowered continues.

In the case where the state where the charge voltage Y is lowered continues for a predetermined period time or longer, the main control unit 123 executes a process of informing abnormality. In the example of FIG. 19, at time t1, the main control unit 123 transmits a first lowering signal to the converter 11, and the converter 11 lowers the charge voltage Y. The main control unit 123 measures a period of time Ty during which the state where the charge voltage Y is lowered by the converter 11 from time t1 continues. When the time Ty during which the state where the charge voltage Y is lowered continues is equal to or longer than a predetermined time, the main control unit 123 performs a process for informing abnormality such as displaying the warning lamp 124. With the information of abnormality, the user can be informed of the abnormality.

Fourth Embodiment

Figure 20:
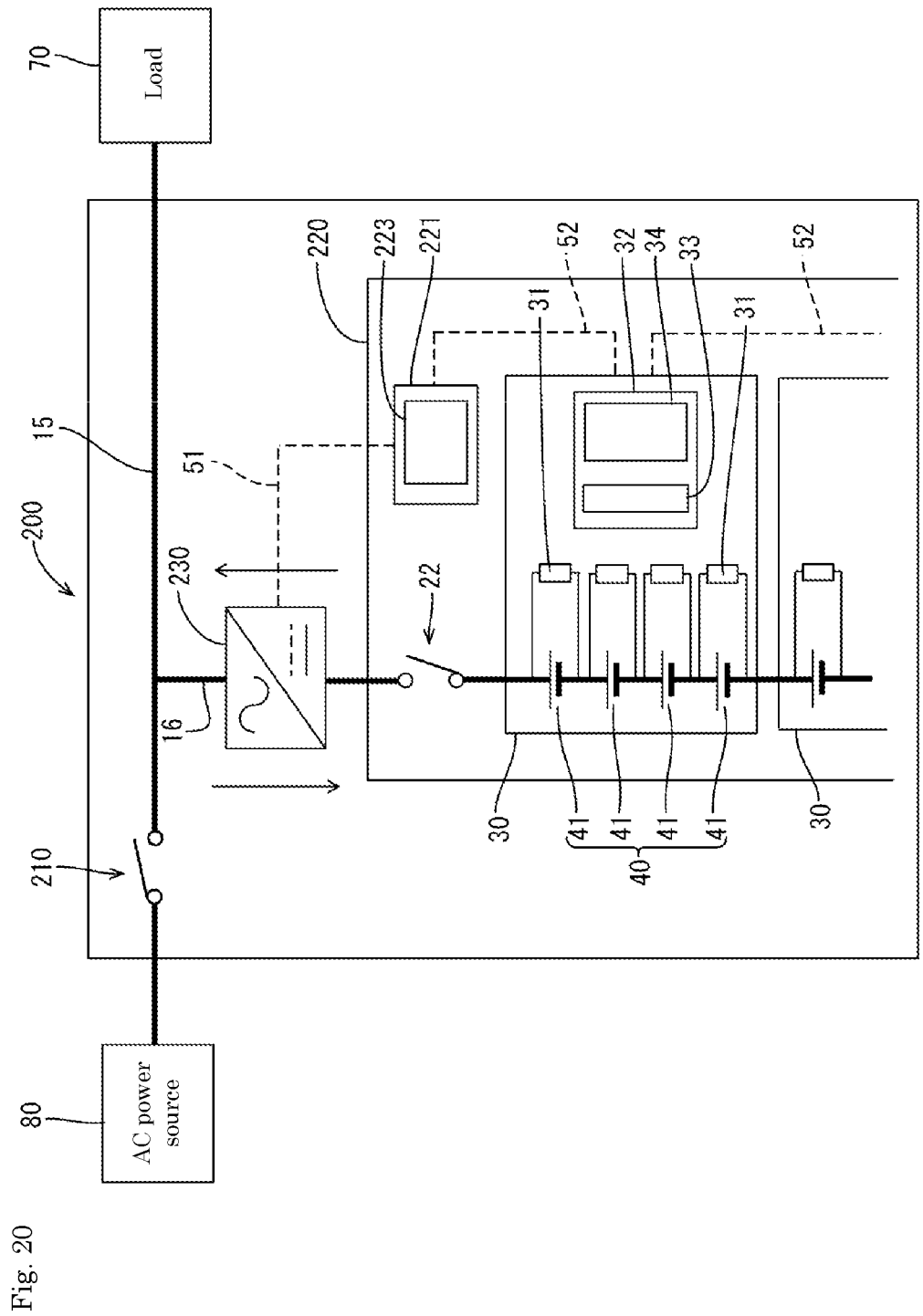
FIG. 20 is a block diagram showing an electrical configuration of a UPS in a fourth embodiment.

FIG. 20 is a circuit diagram of a UPS 200. The UPS 200 of the fourth embodiment includes an AC switch 210, a bidirectional converter 230, and an energy storage apparatus 220. The bidirectional converter 230 is an example of a "power converter". The bidirectional converter 230 is an example of a "charger". The UPS 200 is an example of an energy storage system.

The AC switch 210 is provided on the power supply line 15 that connects the AC power source 80 and the load 70. The AC switch 210 may be omitted. The AC power source 80 is an example of a main power source.

The energy storage apparatus 220 is connected to the power supply line 15 via the branch line 16. The energy storage apparatus 220 includes a plurality of energy storage blocks 30, a battery management apparatus (hereinafter referred to as "BMU") 221 that manages the energy storage blocks 30, and a switch 22. The battery management apparatus 221 includes a main control unit 223. The battery management apparatus 221 is an example of a management apparatus, and the main control unit 223 is an example of a control unit.

The bidirectional converter 230 is provided on the branch line 16. The bidirectional converter 230 is in parallel with the AC power source 80 or the load 70.

The UPS 200 is a parallel processing UPS. The parallel processing UPS supplies the power of the AC power source 80 to the load 70 without performing power conversion.

When the AC power source 80 outputs power, the bidirectional converter 230 converts part of the electric power supplied from the AC power source 80 from AC to DC and outputs a charge current to the energy storage apparatus 220. Similar to the converter 11 of the first embodiment, the bidirectional converter 230 performs charge control on the energy storage apparatus 220 on the basis of the total voltage of the energy storage apparatus 220, rather than finely controlling the charge such that the voltage of the energy storage device having the highest cell voltage becomes constant by using the voltage of each energy storage device 41.

When the power of the AC power source 80 stops, the bidirectional converter 230 converts the electric power supplied from the energy storage apparatus 20 from DC to AC and outputs to the load 70.

The main control unit 223 of the BMU 221 monitors the cell voltage of each energy storage device 41 of the energy storage block 30 on the basis of the output of the CMU 32 during the charge. When the cell voltage of any of the energy storage devices 41 of the energy storage apparatus 220 exceeds the first threshold during the charge, the main control unit 223 of the BMU 221 outputs a lowering signal to the bidirectional converter 230 to lower the charge voltage Y from the initial value Yo. Since the charge voltage is lowered, each energy storage device 41 of the energy storage apparatus 220 can be charged within the normal usable area (see FIG. 5) without stopping the bidirectional converter 230.

When the bidirectional converter 230 is stopped for charge control, it takes time to restart, and a delay may be caused in power output of the bidirectional converter 230. If there is a delay in power output of the bidirectional converter 230, along with a stop of the power output of the AC power source 80, an instantaneous interruption in which power supply is cut off may occur when switching is performed to power supply from the AC power source 80 to the energy storage apparatus 20. Since the UPS 200 according to the fourth embodiment can control charge of the energy storage apparatus 20 without stopping the bidirectional converter 230, it is possible to suppress an instantaneous interruption.

Other Embodiments

The technology disclosed in the present description is not limited to the embodiments described with reference to the above description and the drawings, and includes, for example, the following various aspects.

(1) In the first to fourth embodiments, the energy storage systems are UPSs 10, 100, and 200. The energy storage system may be an energy storage system used for other applications including vehicles such as automatic guided vehicles and railways, large-scale power generation facilities, and the like. The energy storage apparatuses 20, 120, and 220 are not limited to energy storage apparatuses for the UPS, but may be energy storage apparatuses for energy storage systems that are used for other applications including vehicles such as automatic guided vehicles and railways, large-scale power generation facilities, and the like. The energy storage apparatuses 20, 120, and 220 each have a plurality of energy storage blocks connected in series. The energy storage apparatuses 20, 120, and 220 each may have only one energy storage block.

(2) In the first to fourth embodiments, the energy storage device 41 is an iron phosphate lithium ion cell. The energy storage device may be an energy storage device including a lithium-containing metal oxide containing Co, Mn, and Ni elements as a positive active material, and including hard carbon for the negative electrode. The energy storage device may be a capacitor.

(3) In the first embodiment, when the cell voltage of any of the energy storage devices 41 of the energy storage apparatus 20 becomes equals to or higher than the first threshold, the main control unit 23 allows the energy storage device 41 whose cell voltage is equal to or higher than the first threshold to be discharged by the discharge circuit 31. When the cell voltage of any of the energy storage device 41 of the energy storage apparatus 20 becomes the third threshold or higher, the main control unit 23 may allow the energy storage device 41 whose cell voltage is equal to or higher than the third threshold to discharge electricity by the discharge circuit 31. The third threshold may be the same value as the first threshold, or may be a value different from the first threshold. The third threshold may be a value smaller than or larger than the first threshold.

The main control unit 23 may allow the energy storage device 41 to be discharged on the basis of the voltage difference between the energy storage devices 41 without using the third threshold. For each energy storage block 30, when the voltage difference between the highest cell voltage Vh and the lowest cell voltage Vmin of the energy storage devices 41 is equal to or larger than the fourth threshold, the main control unit 23 may allow the energy storage device 41 to discharge electricity by the discharge circuit 31 such that the voltage difference becomes less than the fourth threshold in each energy storage block 30.

(4) In the first embodiment, when the cell voltage of the energy storage device 41 becomes equal to or higher than the first threshold, the main control unit 23 allows the energy storage device 41 whose cell voltage is equal to or higher than the first threshold to be discharged by the discharge circuit 31. The energy storage device 41 may discharge electricity by means other than the discharge circuit 31, such as a case where discharge is made from the energy storage device 41 to the load.

(5) In the second embodiment, after the charge voltage Y is lowered from the initial value Yo, when the cell voltage of the energy storage device 41 becomes equals to or higher than the first threshold again, the second lowering signal is sent to the converter 11 and the charge voltage Y is further lowered. If the cell voltage of the energy storage device 41 is equal to or higher than the first threshold even though the charge voltage Y is lowered in two steps, the main control unit 23 sends the second stepwise lowering notification to the converter 11 to lower the charge voltage of the converter 11 in three steps. If the cell voltage is equal to or higher than the first threshold even through the charge voltage Y is lowered, the main control unit 23 sends a stepwise lowering notification to the converter 11 a plurality of times to lower the charge voltage Y in multiple steps (three or more steps) until the cell voltage becomes lower than the first threshold.

(6) In the first embodiment, for each energy storage block 30, when the voltage difference between the highest cell voltage Vh and the lowest cell voltage Vmin is equal to or less than the reference potential difference (Vs in FIG. 11), a restoration signal is output to the converter 11 and the charge voltage Y of the converter 11 is restored to the initial value Yo. For each energy storage block 30, when the voltage difference between the maximum cell voltage Vh and the average cell voltage Va is equal to or less than the reference potential difference, a restoration signal may be output to the converter 11 to restore the charge voltage Y of the converter 11 to the initial value Yo.

(7) In the first to third embodiments, the converter 11 performs charge control on the energy storage apparatuses 20 and 120. Charge control may be performed by a device other than the converter. A charge control device (charger) that switches the charge voltage may be provided between the converter and the energy storage apparatus. A first lowering signal may be output from the battery management apparatus of the energy storage apparatus to the charge control device, and the charge voltage may be lowered by the charge control device. Further, the energy storage apparatus 20 may not be controlled with float charge as long as charge control is performed with the total voltage.

Figure 21:
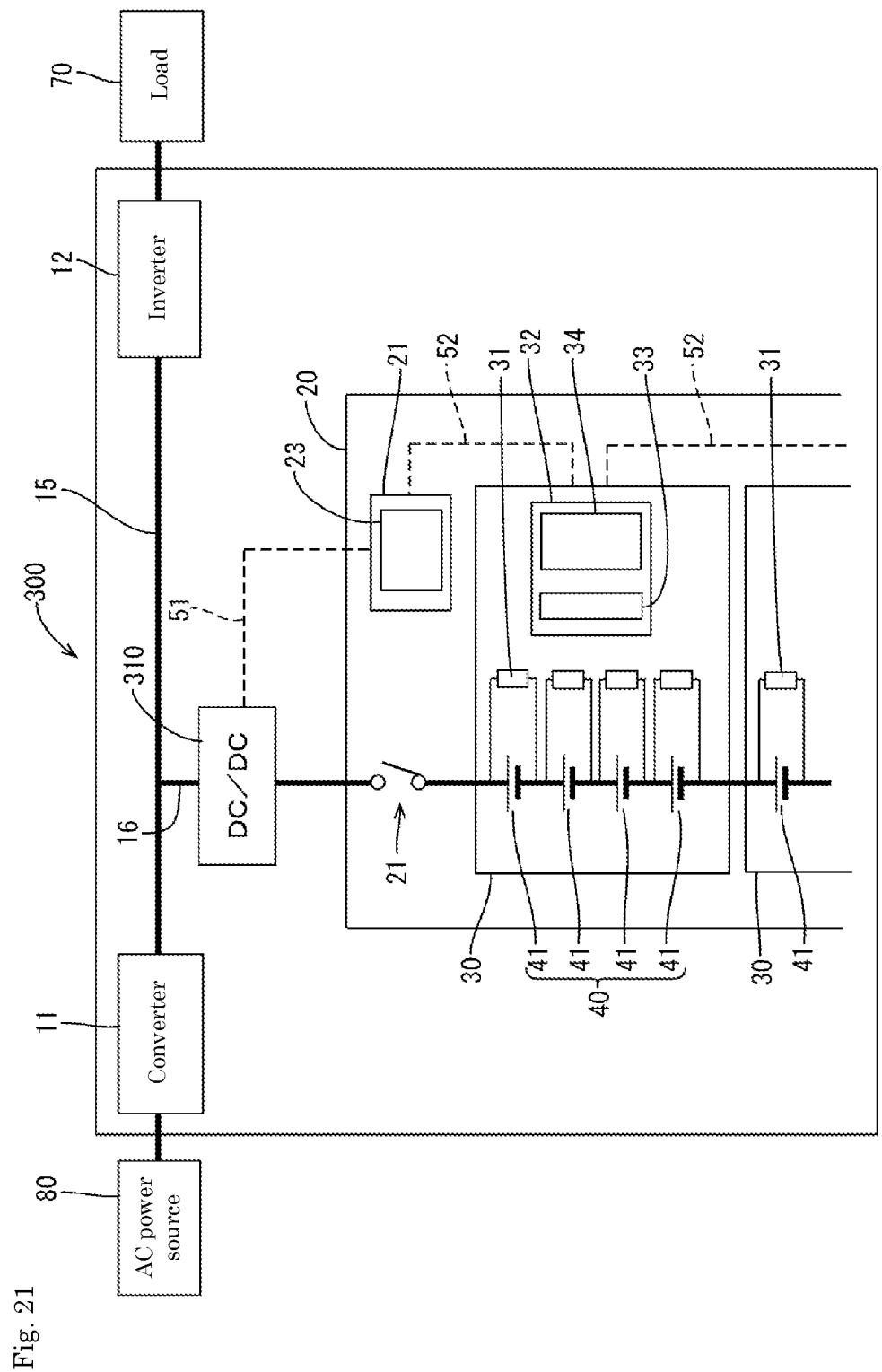
FIG. 21 is a block diagram showing an electrical configuration of a UPS in another embodiment.

(8) FIG. 21 is a circuit diagram of the UPS 300. In the UPS 300, the bidirectional DC-DC converter 310 is added to the UPS 10 of the first embodiment. The UPS 300 is an example of an energy storage system. The DC-DC converter 310 is disposed on the branch line 16. When the AC power source 80 is outputting power, the DC-DC converter 310 allows the energy storage apparatus 20 to be charged by converting the power supply voltage of the power supply line 15. Further, when the AC power source 80 stops power output, the DC-DC converter 310 restores the output voltage of the energy storage apparatus 20 to the power supply voltage of the power supply line 15 and outputs it.

The main control unit 23 of the BMU 21 monitors the cell voltage of each energy storage device 41 of the energy storage block 30 on the basis of the output of the CMU 32 during the charge. When the cell voltage of any of the energy storage devices 41 exceeds the first threshold during charge, the main control unit 23 of the BMU 21 outputs a first lowering signal to the DC-DC converter 310 to lower the charge voltage Y. When the charge voltage Y is lowered, the energy storage device 41 of the energy storage apparatus 20 can be charged within the normal usable area without stopping the DC-DC converter 310. The DC-DC converter 310 is an example of a "power converter".

(9) The charge method includes, when the voltage of any of the energy storage devices becomes equal to or higher than the first threshold during charge of the energy storage devices connected in series, giving a lowering notification from the management apparatus of the energy storage device to the charger, and a step of lowering the charge voltage by the charger.

DESCRIPTION OF REFERENCE SIGNS 10, 100, 200, 300: uninterruptible power system (an example of "energy storage system")
11: converter (an example of "charger")
12: inverter
21, 121, 221: BMU (an example of "management apparatus")
23, 123, 223: main control unit (an example of "control unit")
20, 120, 220: energy storage apparatus
30: energy storage block
31: discharge circuit
34: sub control unit
41: energy storage device
230: bidirectional converter (an example of "power converter")
310: DC-DC converter (an example of "power converter")
F: low-change area
S1: first high-change area (an example of "high-change area of high charge state")
S2: second high-change area

The invention claimed is:

1. A management apparatus comprising a control unit in communication with a charger that performs constant current constant voltage charge, the control unit being configured to:
perform constant current charge control after the start of charge and before a total voltage of a plurality of energy storage devices connected in series reaches a predetermined voltage value;
when the total voltage reaches the predetermined voltage value:
(i) switch to constant voltage charge control in which the total voltage is maintained; and
(ii) gradually decrease a charge current of the plurality of energy storage devices; and
when, during the constant voltage charge control, a voltage of any of the plurality of energy storage devices becomes equal to or higher than a first threshold, give to the charger a lowering notification to lower charge voltage,
wherein the charger controls charge on a basis of the maintained total voltage of the plurality of the energy storage devices.

2. The management apparatus according to claim 1, wherein
each of the plurality of the energy storage devices has:
a low-change area in which a rate of change of an open circuit voltage with respect to a state of charge is relatively low; and
a high-change area in a high charge state, the high-change area being in a state of charge higher than the state of charge of the low-change area and having a relatively high rate of change of the open circuit voltage with respect to the state of charge than the rate of change in the low-change area, and
the first threshold is included in the high-change area in the high charge state.

3. The management apparatus according to claim 1, further comprising a discharge circuit that allows the plurality of the energy storage devices to discharge electricity individually, wherein the control unit allows, among the plurality of the energy storage devices, only an energy storage device in which a voltage becomes equal to or higher than a third threshold to discharge electricity by the discharge circuit.

4. The management apparatus according to claim 1, wherein, after the charge voltage is lowered, when the voltage of any of the plurality of the energy storage devices is equal to or higher than the first threshold, the control unit gives a stepwise lowering notification to the charger to further lower the charge voltage.

5. The management apparatus according to claim 4, wherein the control unit gives the stepwise lowering notification a plurality of times to lower the charge voltage in multiple steps.

6. The management apparatus according to claim 1, wherein, when the voltages of all of the plurality of the energy storage devices are equal to or lower than a second threshold, the control unit gives, to the charger, a restoration notification to restore the charge voltage to an initial value.

7. The management apparatus according to claim 6, wherein the control unit performs a process of informing abnormality when the charger repeats adjustment of the charge voltage either a predetermined number of times or a predetermined period of time or longer.

8. The management apparatus according to claim 1, wherein, when a voltage difference between the plurality of the energy storage devices is equal to or less than a predetermined value, the control unit gives a restoration notification to restore the charge voltage of the charger to an initial value.

9. The management apparatus according to claim 8, wherein the control unit performs a process of informing abnormality when a state in which the charge voltage is lowered continues for a predetermined period of time or longer.

10. An energy storage apparatus comprising:
one or a plurality of energy storage blocks connected in series; and
the management apparatus according to claim 1,
wherein each of the energy storage blocks includes a plurality of energy storage devices connected in series.

11. An energy storage system comprising:
a charger;
the energy storage apparatus according to claim 10; and
a charge path that connects the charger and the energy storage apparatus.

12. The energy storage system according to claim 11, wherein:
in response to the lowering notification, the charger lowers the charge voltage from an initial value, and
the charge voltage after the lowering is included in the high-change area in the high charged state in terms of a voltage per one of the plurality of the energy storage devices.

13. The energy storage system according to claim 11, wherein a charge control circuit that controls charge of the energy storage apparatus is not provided on the charge path.

14. The energy storage system according to claim 11, further comprising:
the energy storage apparatus connected to a power supply line for supplying electric power from a main power source to a load via a branch line; and
a power converter provided on the branch line,
wherein:

the power converter is a bidirectional power converter that:
   converts part of electric power supplied from the main power source and outputs a charge current to the energy storage device, and
   converts electric power supplied from the energy storage device to output a discharge current to the load, and
when the voltage of any of the plurality of the energy storage devices of the energy storage apparatus becomes equal to or higher than the first threshold, the control unit gives the lowering notification to the power converter to lower the charge voltage.

\* \* \* \* \*